United States Patent
Kennedy et al.

(10) Patent No.: US 9,565,313 B1
(45) Date of Patent: *Feb. 7, 2017

(54) MUTUAL ASSISTANCE ROUTING SYSTEM FOR IMPROVED UTILIZATION OF CUSTOMER SERVICE RESOURCES

(71) Applicant: West Notifications, Inc., Omaha, NE (US)

(72) Inventors: James Lehr Kennedy, Columbus, OH (US); Julia Lynn McDevitt, Columbus, OH (US); Adam Thomas Bangston, Westerville, OH (US); James Francis Curran, Alexandria, OH (US); Verun Reddy Gade, Columbus, OH (US); Demond LeWayne Smith, Columbus, OH (US); Dongyun Wang, Westerville, OH (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,893

(22) Filed: Apr. 14, 2015

Related U.S. Application Data

(63) Continuation of application No. 14/192,047, filed on Feb. 27, 2014, now Pat. No. 9,008,299, which is a continuation of application No. 12/490,716, filed on Jun. 24, 2009, now Pat. No. 8,755,512.

(60) Provisional application No. 61/075,205, filed on Jun. 24, 2008.

(51) Int. Cl.
*H04M 3/00* (2006.01)
*H04M 3/523* (2006.01)
*H04M 3/51* (2006.01)
*H04M 3/493* (2006.01)

(52) U.S. Cl.
CPC ......... *H04M 3/5237* (2013.01); *H04M 3/4931* (2013.01); *H04M 3/5116* (2013.01); *H04M 3/5133* (2013.01); *H04M 3/5232* (2013.01)

(58) Field of Classification Search
CPC   H04M 3/5232; H04M 3/5233; H04M 3/5175; H04M 3/5183; H04M 3/5158; H04M 3/5166; H04M 3/523
USPC ....................................... 379/265.01, 265.11
See application file for complete search history.

(56) References Cited

U.S. PATENT DOCUMENTS

2005/0245232 A1\* 11/2005  Jakober et al. ............... 455/410

\* cited by examiner

*Primary Examiner* — Rasha Al Aubaidi
(74) *Attorney, Agent, or Firm* — Raffi Gostanian

(57) ABSTRACT

The invention disclosed is a new system and method for providing the mutual sharing of resources devoted to customer service. The system utilizes a telecommunications switching apparatus to rout incoming customer contacts to one or more pools of customer service agents. The system provides for a universal customer service interface that allows customer service agents to assist customers of other related companies. The automated system for sharing customer service resources includes a mutual assistance routing system in communication with requesting users of customer service agents, responding providers of customer service agents, databases containing customer information, thereby allowing customers who contact the requesting user to be served by shared agents.

20 Claims, 31 Drawing Sheets

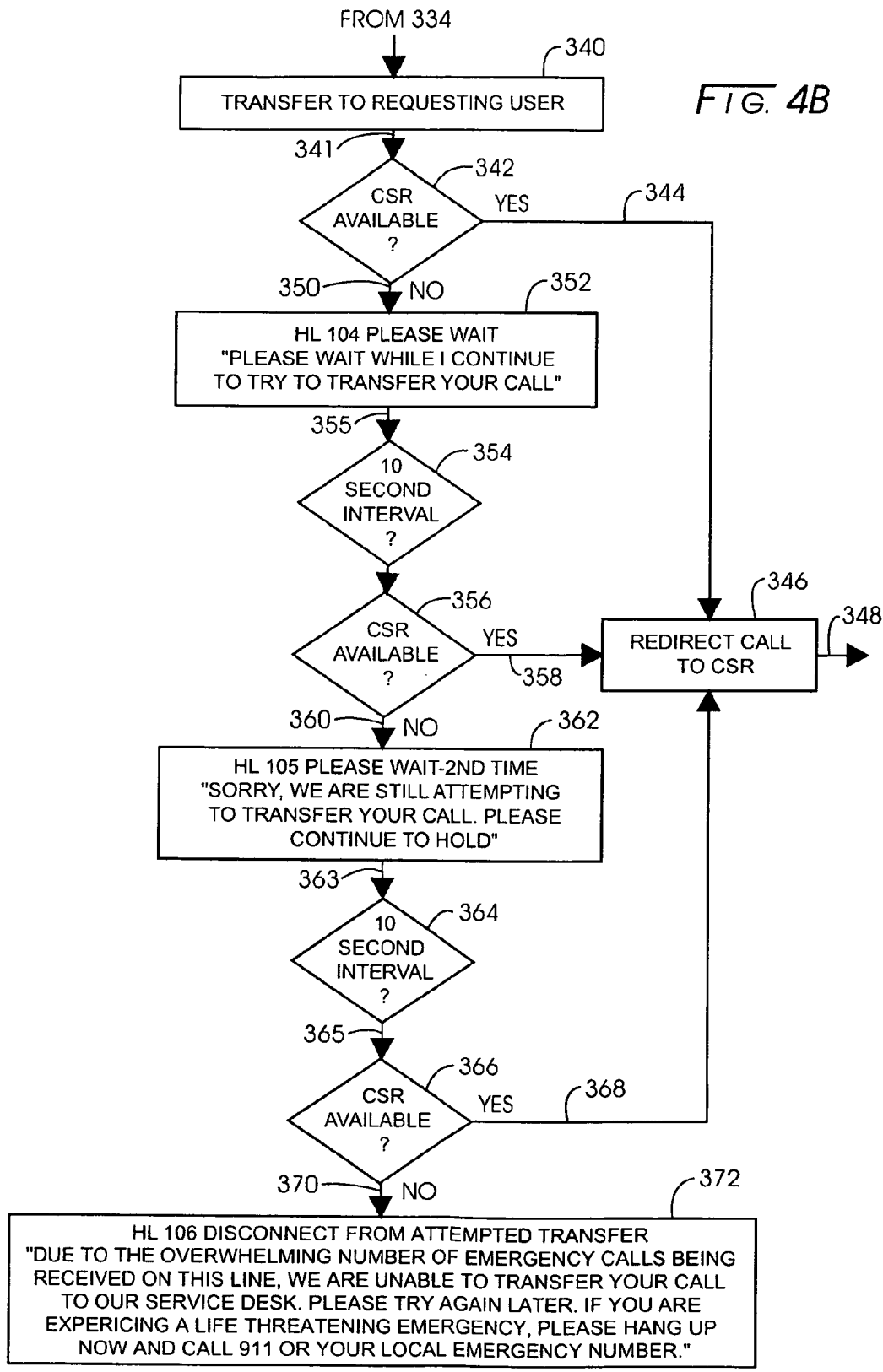

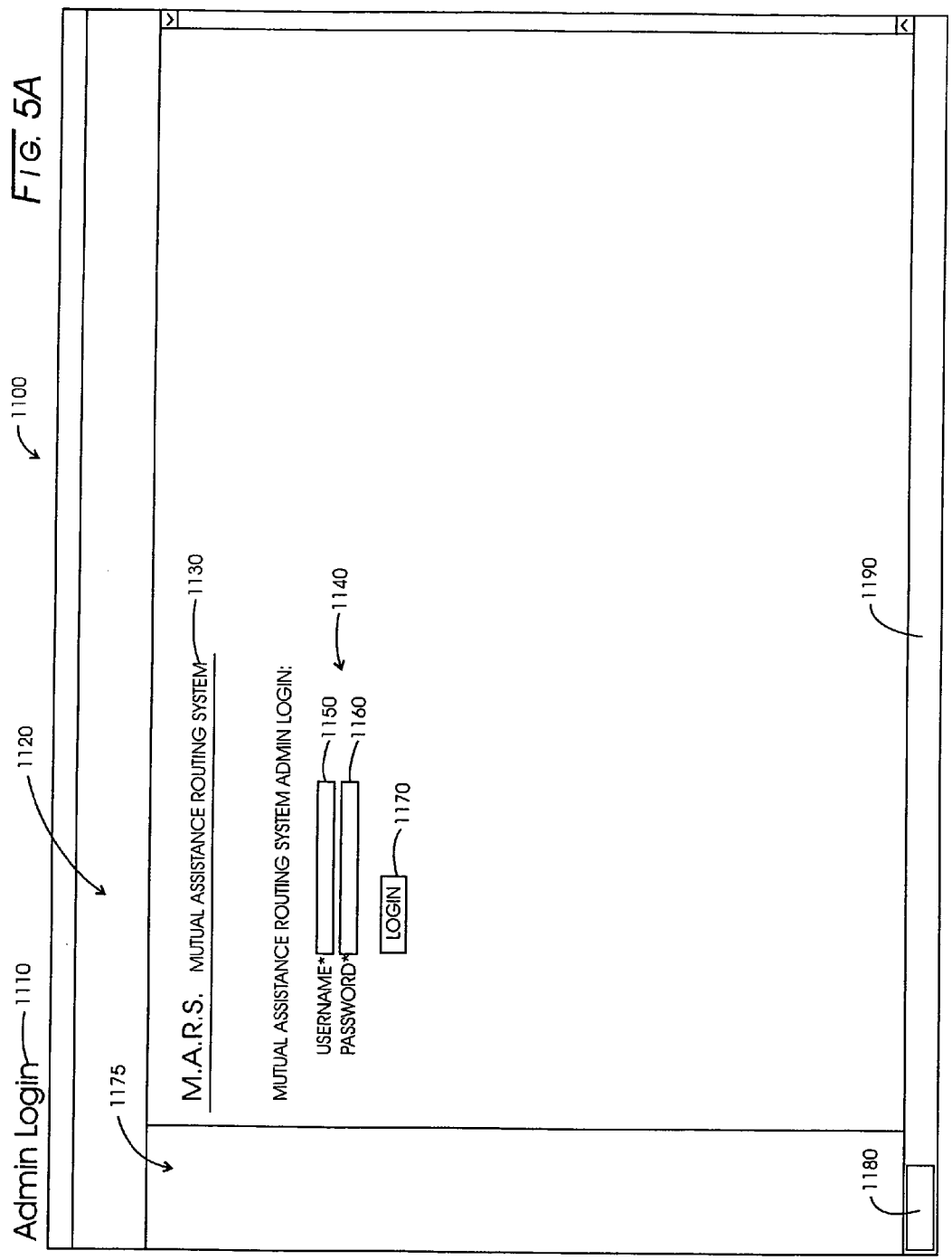

FIG. 5B

Responding Utility Screen- Offer Agents —1210
—1200
—1220

| M.A.R.S. —1230  MUTUAL ASSISTANCE ROUTING SYSTEM |

—1240

PLEASE CHOOSE THE UTILITY THAT YOU WILL BE TAKING CALLS FOR FROM LIST BELOW

[ACME POWER & LIGHT ▼] —1242

ENTER THE INFORMATION BELOW FOR THE PHONE NUMBER YOU WISH TO HAVE CALLS DELIVERED ON

PHONE NUMBER:  800-555-1212 —1244
NUMBER OF AGENTS* [15] —1246

PLEASE ENTER THE DATE/TIME YOU WISH THE PROGRAM TO BE ACTIVE UNTIL, OR CHECK THE BOX TO LEAVE THE PROGRAM ACTIVE UNTIL MANUALLY DEACTIVATED

[        ] —1248
mm/dd/yyyy
☑ ACTIVE UNTIL MANUALLY DEACTIVATED —1250

[SUBMIT] —1270

—1290

—1280

Requesting Utility- Program Activation — 1310

FIG. 5C

M.A.R.S. MUTUAL ASSISTANCE ROUTING SYSTEM — 1330

PLEASE CHOOSE THE RESPONDING UTILITY FROM THE LIST BELOW

AMERICAN
ACME POWER & LIGHT — 1342

ENTER THE INFORMATION BELOW FOR THE PHONE NUMBERS YOU WISH TO HAVE THE CALLS DELIVERED ON

DISTRIBUTION TYPE ⦿ PRIORITY ◯ ALLOCATION — 1344

| UTILITY | PHONE NUMBER | REPS | DIST |
|---------|--------------|------|------|
|         | 800          | 15   | 100  |

— 1346

PLEASE ENTER A MESSAGE FOR ALL CALLERS TO HEAR. THIS MESSAGE CAN CONTAIN A GENERAL RESTORATION UPDATE OR ANY OTHER MESSAGE YOU WOULD LIKE THE CSR TO PROVIDE TO THE CUSTOMER.

— 1348

DO YOU WANT TO CALL BACK CUSTOMERS WHO REPORT OUTAGES? — 1350
⦿ YES   ◯ NO

PLEASE ENTER THE DATE/TIME YOU WISH THE PROGRAM TO BE ACTIVE UNTIL, OR CHECK THE BOX TO LEAVE THE PROGRAM ACTIVE UNTIL MANUALLY DEACTIVATED mm/dd/yyyy — 1352
☑ ACTIVE UNTIL MANUALLY DEACTIVATED — 1354

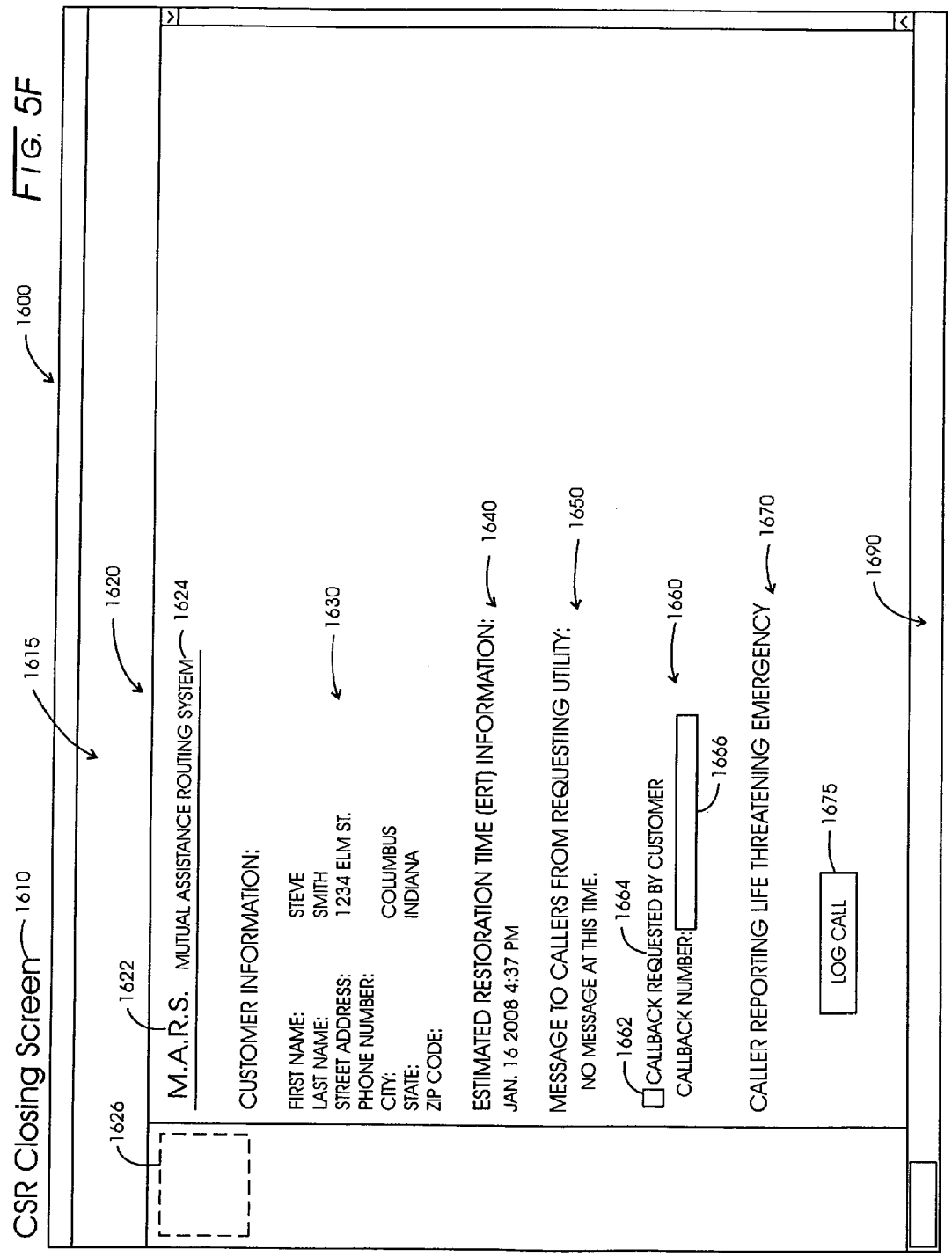

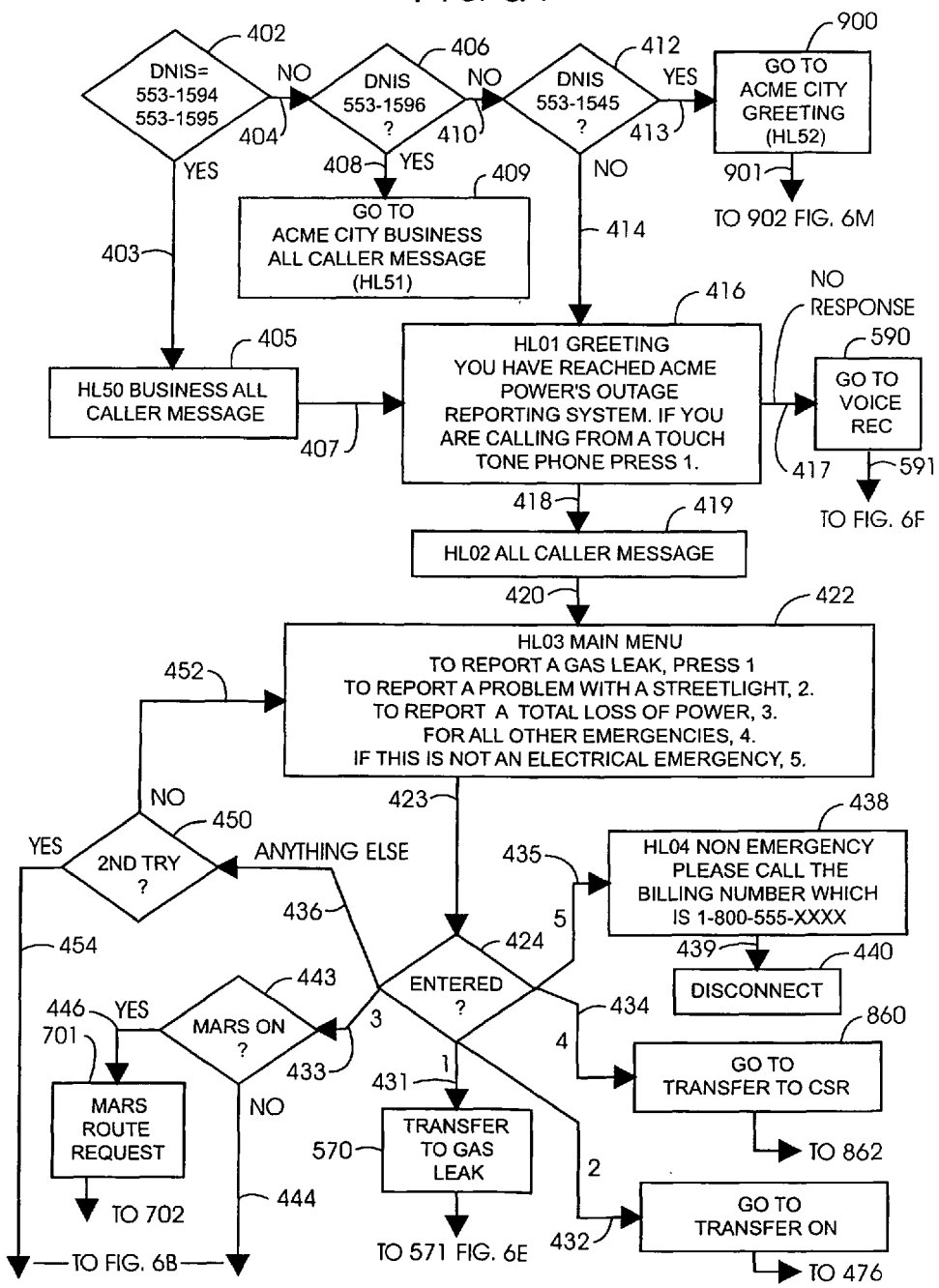

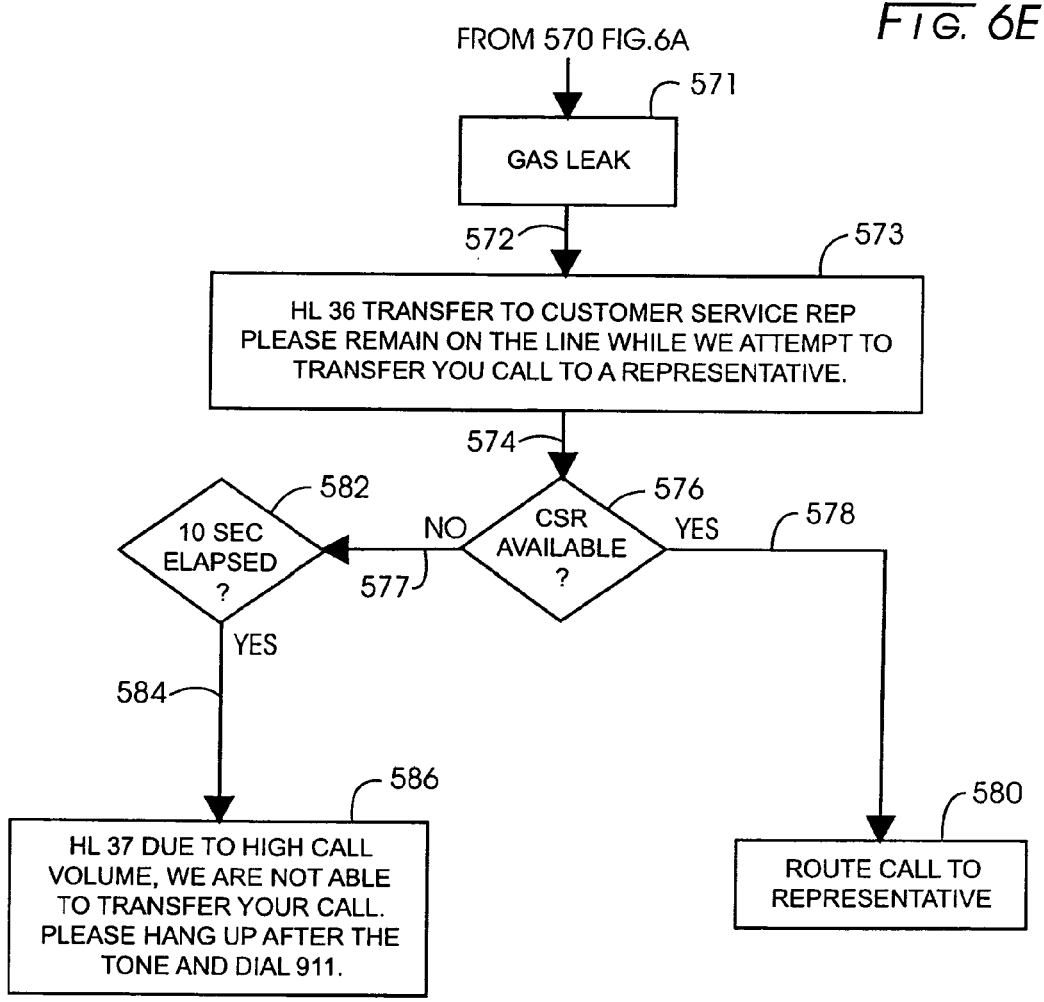

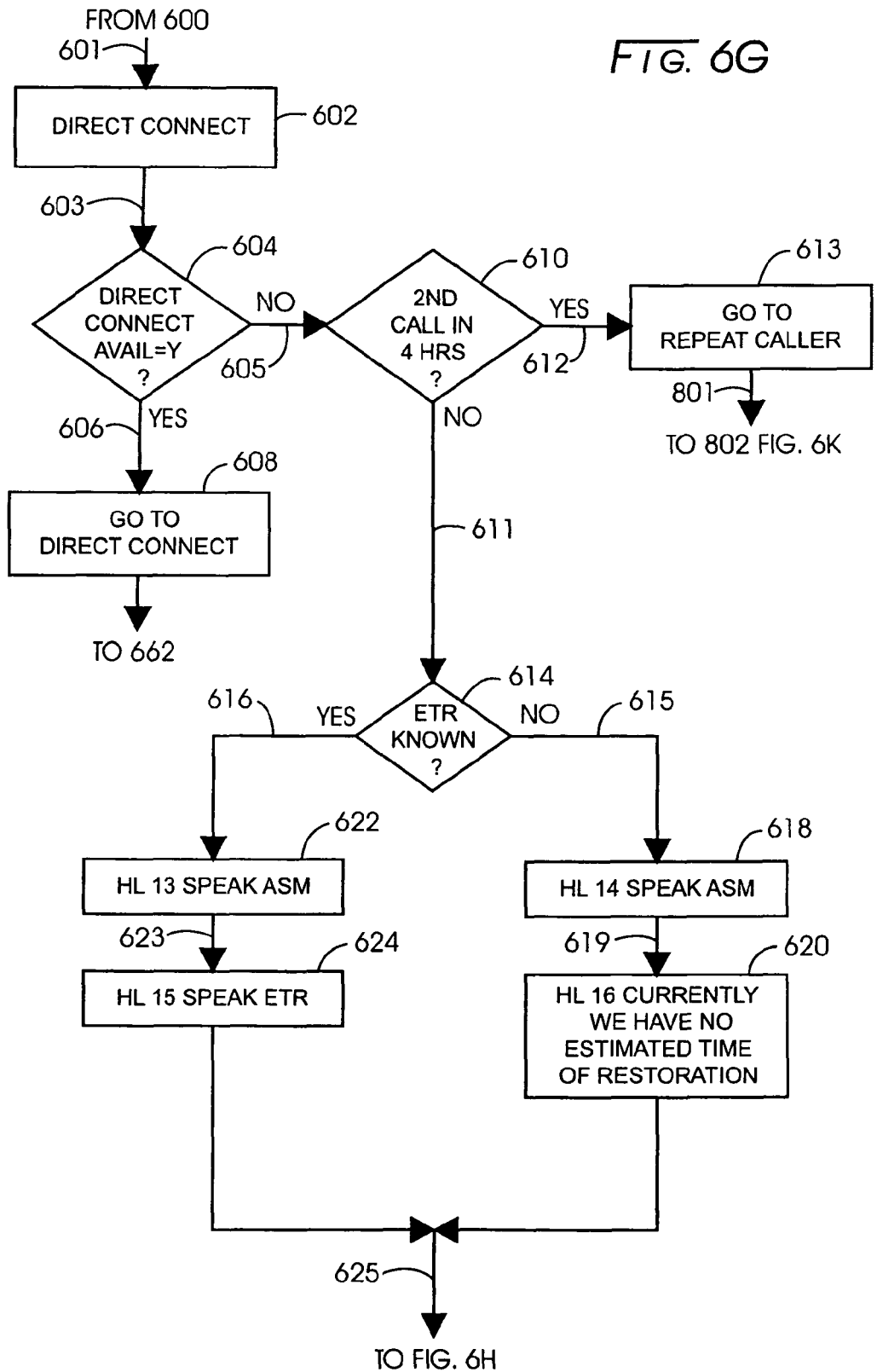

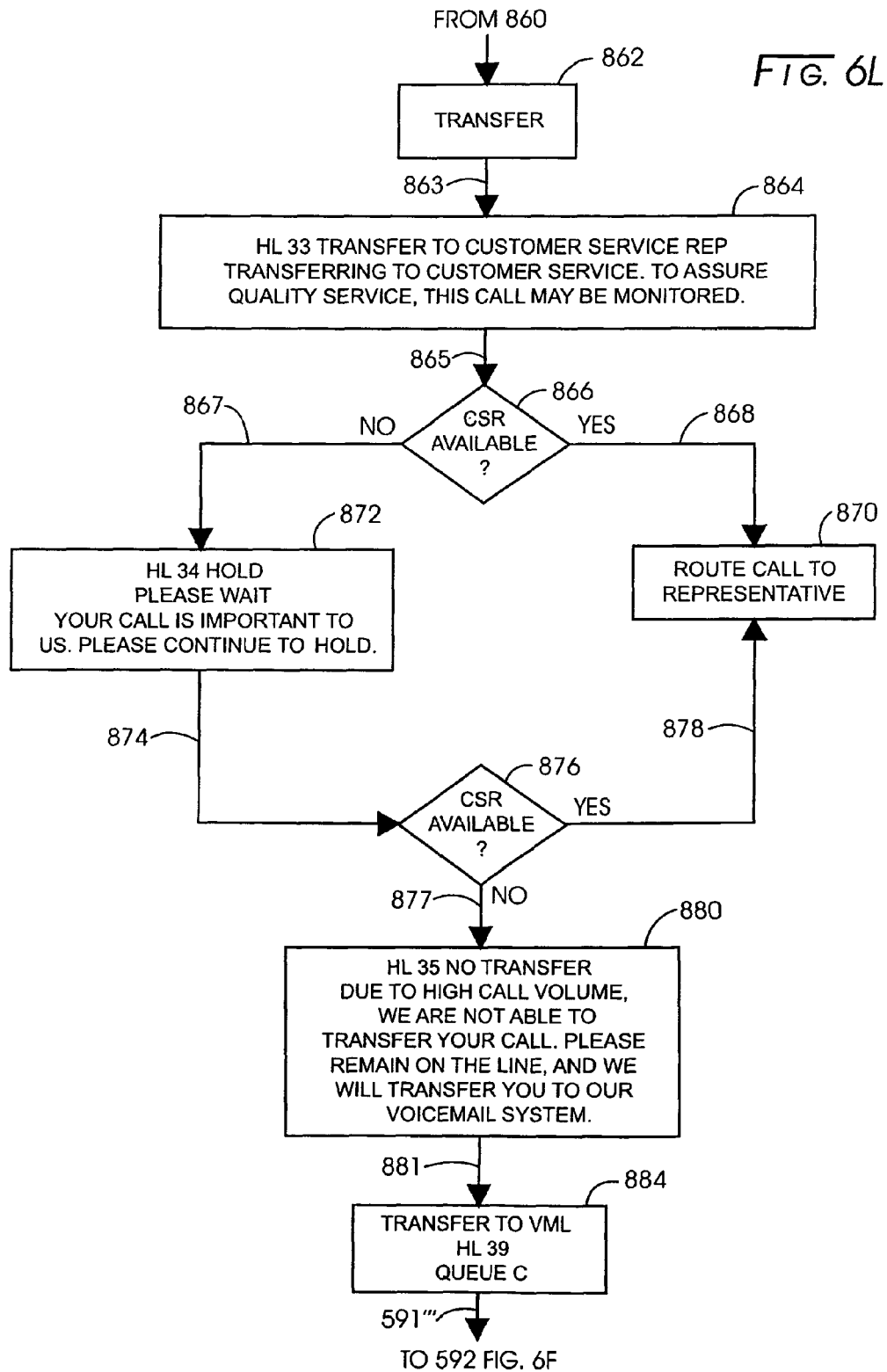

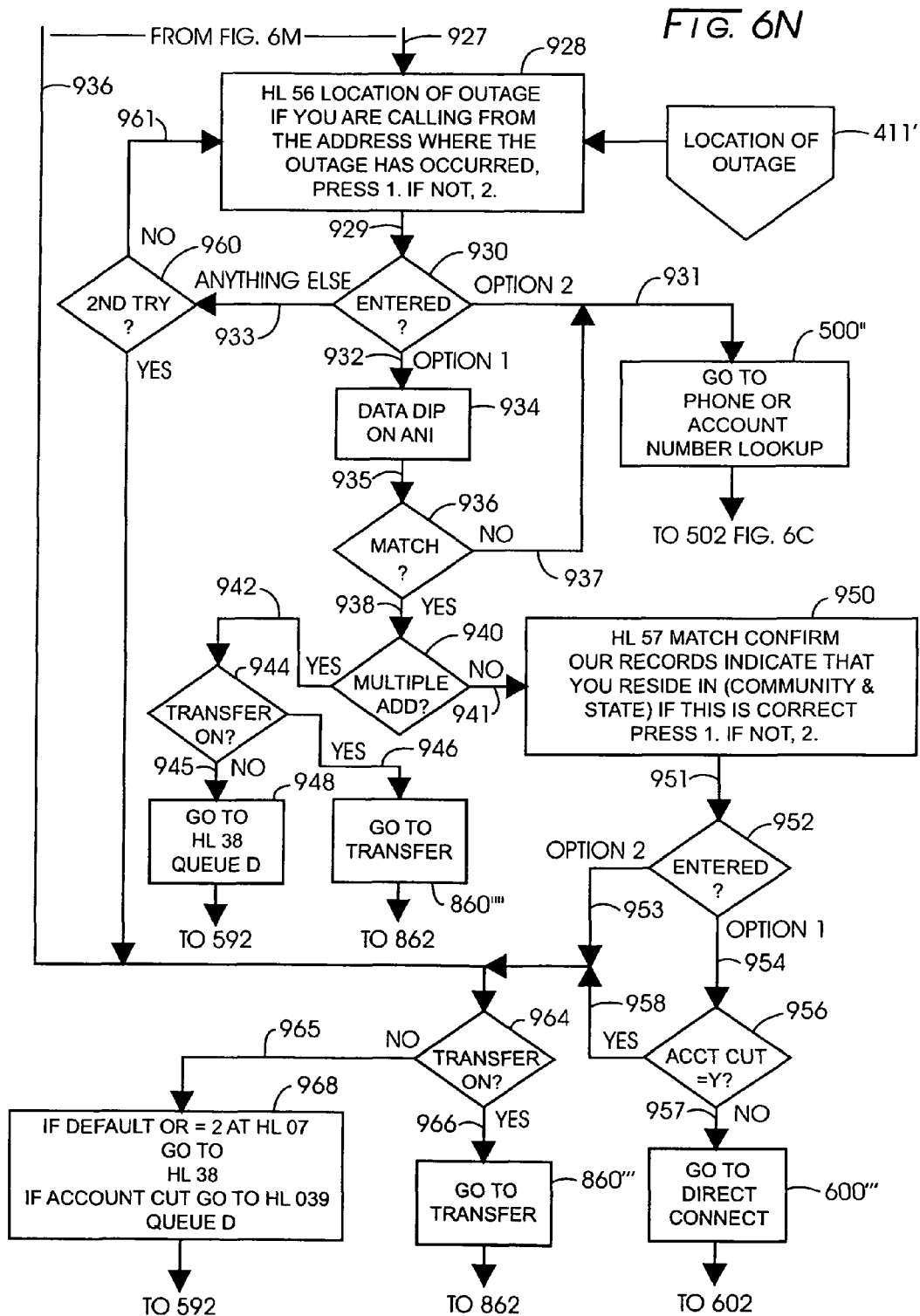

ACME 350 CDR - ICR
VERSION 1.0
LAST MODIFIED Friday NOVEMBER 2

| Field Name | Data Type | | Start | End | Description |
|---|---|---|---|---|---|
| UNIT | 9 | (5) | 1 | 5 | UNIT/MACHINE NUMBER |
| LINE | 9 | (3) | 6 | 8 | PHONE LINE/PORT |
| XDATE | 9 | (8) | 9 | 16 | DATE - CCYYMMDD |
| XTIME | 9 | (6) | 17 | 22 | TIME - HHMMSS |
| DURATION | 9 | (5) | 23 | 27 | CALL DURATION IN SECONDS |
| CALLED | 9 | (10) | 28 | 37 | CALL NUMBER (500XXXXXXX) |
| ENTERED-NO | X | (1) | 38 | 38 | ENTER NUMBER TYPE |
| | | | | | P - PHONE NUMBER |
| | | | | | A - ACCOUNT NUMBER |
| | | | | | N - NAME ADDRESS CAPTURE |
| | | | | | X - DEFAULT |
| DEMATCH | X | (1) | 39 | 39 | DATABASE MATCH FLAG |
| | | | | | Y - MATCHED IN DATABASE |
| | | | | | N - NO MATCH IN DATABASE |
| | | | | | F - DC TIMEOUT |
| | | | | | E - DC ERROR |
| | | | | | D - DC DOWN |
| | | | | | X - DEFAULT |
| MATCH-CONF | X | (1) | 40 | 40 | MATCH CONFIRMED |
| | | | | | Y - CALL CONFIRMED |
| | | | | | X - DEFAULT |
| FAQ12 | X | (1) | 219 | 219 | FAQ 12 |
| | | | | | Y - YES |
| | | | | | N - NO |
| | | | | | X - DEFAULT |
| TRANSFER-NO | 9 | (4) | 220 | 223 | REP ID |
| TRANSFER-NO | 9 | (25) | 224 | 248 | REP NAME |
| TRANSFER-NO | 9 | (8) | 249 | 256 | PROGRAM ID |
| TRANSFER-NO | 9 | (3) | 257 | 259 | REQUESTING UTILITY |
| TRANSFER-NO | 9 | (10) | 260 | 269 | REQUESTING UTILITY PHONE NUMBER |
| TRANSFER-NO | 9 | (3) | 270 | 272 | RESPONDING UTILITY |
| TRANSFER-NO | 9 | (10) | 273 | 282 | RESPONDING UTILITY PHONE NUMBER |

NOTE All Numerical fields are Right Justified/Left Zero Fill (RJ/LZF) unless otherwise specified

FIG. 7B

MUTUAL ASSISTANCE ROUTING SYSTEM FOR IMPROVED UTILIZATION OF CUSTOMER SERVICE RESOURCES

CROSS-REFERENCE TO RELATED APPLICATIONS

This application claims priority to U.S. patent application Ser. No. 14/192,047, filed on Feb. 27, 2014 and entitled, MUTUAL ASSISTANCE ROUTING SYSTEM FOR IMPROVED UTILIZATION OF CUSTOMER SERVICE RESOURCES, which claims priority to U.S. patent application Ser. No. 12/490,716, filed on Jun. 24, 2009 and entitled, MUTUAL ASSISTANCE ROUTING SYSTEM FOR IMPROVED UTILIZATION OF CUSTOMER SERVICE RESOURCES, now issued U.S. Pat. No. 8,755,512, which claims priority to U.S. provisional patent application. Ser. No. 61/075,205, filed Jun. 24, 2008, which are incorporated by reference herein in their entirety.

STATEMENT REGARDING FEDERALLY SPONSORED RESEARCH

None

BACKGROUND OF THE INVENTION

The present invention generally relates to sharing of customer service resources during periods of high demand. For decades, certain public safety agencies, such as fire departments, have agreed to provide mutual assistance during emergency situations. Thus when one local fire department has a massive fire emergency, that department can call upon its neighbors to provide assistance. If the neighboring departments are willing and able to assist, then the emergency can be abated, and the assisting department can come to expect assistance if they should later experience an emergency. In the past, similar efforts at mutual assistance have been attempted in other industries, but to a less effective level. A hurdle to effective sharing of resources has previously been the need to physically deliver the needed resources to a distant location. With the expansion of telecommunications resources, effective transfer of communications between call agents can be accomplished without the necessity for the agents to physically travel.

Businesses needing to provide customer service resources must balance the projected need for those resources by customers with the cost of providing customer service resources at low demand periods, or when resources are not actually utilized by customers. A number of enterprises may be faced with occasions when demand for customer service far exceeds their ability to supply that service. Such occasions may include time of natural disaster, product recalls, or civil disruption, and the enterprises involved may be utilities, banks, transportation systems, health departments, government agencies, and non-governmental entities such as the Red Cross.

A continuing problem for electric utilities are periods containing an extremely high volume of requests for customer service agents during times of service disruption, e.g. when electric power is interrupted by storm damage. Presently, most "high volume call answering" (HVCA) is carried out using interactive voice response (IVR) systems (or an interactive call system (ICS), where the customer call is routed to an automated answering system. Such IVR systems are effective essentially for only expected types of customer requests, such as service outage reporting. When a customer has a situation requiring assistance that was not anticipated by the IVR administrators, or when the customer is unable to effectively navigate the IVR system, in most cases when HVCA systems have been activated, the customer cannot be routed to a live customer service representative (CSR) simply because no such representative is available. The customer is forced to leave a voicemail message, the response time to which may be very slow, due to the low availability of agents. Moreover, during the initial phases of an emergency, customers are known to be relatively patient, and accepting of the HVCA message systems, but as additional time passes, customers become increasingly frustrated by the perceived or actual unresponsiveness of their serving utility. For publicly regulated utilities, there may actually be regulatory standards requiring efficient response to customer inquiries, and failure to meet those standards can lead to penalties, or potentially lost customers. Similar situations where high incoming customer contacts overwhelm customer service capacity occur in other industries, such as in transportation where storms disrupt departures, or in banking where a technical problem may lead to unforeseen high call volumes.

The problem of dealing with HVCA is most pronounced in the electric utility industry, where natural disasters can severely disrupt service for the single provider of an area. Other utilities, such as telecommunications, cable television, water and natural gas may be to a lesser extent disrupted. During a service disruption, while one utility may have an extremely high volume, a utility located in another geographic region may have a relatively low volume of contacts requesting a customer service agent. Unfortunately, a number of obstacles have prevented utilities from sharing access to customer service agents with other utilities in need of assistance. One obstacle is the wide variety of interfaces that customer service agents of various utilities utilize on the computer systems that provide information about particular customers that are contacting the utility. In order for the customer service agents of one utility to assist customers of another utility, those agents would first need to be trained on how to utilize the interface of the utility being assisted. Advance preparation would be desirable, and in order to have that preparation, it would be necessary to anticipate which utility may be likely to provide assistance. In terms of emergency outages, predicting when, where, and the extent of outages is extremely difficult, and impossible to accomplish with any reliability.

Another obstacle are barriers in agreeing to terms, metering, timing, and compensation, for instance, between utilities that might wish to provide support for another utility having an emergency need. For instance, if mutual assistance is needed for only a few hours, by the time two parties might agree on the terms under which they might provide assistance in responding to customer service contacts, the emergency situation may already have been resolved. If the emergency situation continues for an extended period, presently, it is common for customer service agents to travel to the location of the emergency (or the customer service facility of the utility needing assistance), and thus added costs related to travel, housing, and inconvenience are incurred. In industries such as airlines or banking, companies with a shortage of customer service capacity may be direct competitors, and be reluctant to assist a competitor when an emergency arises. Public agencies, for instance the Federal Emergency Management Agency and local governments may not be able to immediately provide assistance because of statutory prohibitions. Thus, it would be desirable to organize an exchange system prior to an event that would allow for rapid activation of sharing of customer resources.

Yet another obstacle is the need to change call center resources on an as-needed basis. A utility may even require additional resources beyond those initially engaged in response to an emergency. For example, a utility responding to another utility experiencing a crisis by providing live agents may at some point need to retrieve those agents in order to deal with its own emergency. Current call routing systems do not enable flexible utilization of resources on a minute-to-minute basis.

Even if terms concerning mutual assistance could be agreed upon prior to the occurrence of an emergency, telecommunications connectivity issues have generally prevented one utility from directly transferring a customer service telephone call to another utility. This barrier is particularly acute when utilities seeking to provide mutual assistance are utilizing different telephone carriers. Utilities have been unable to transfer a call from an AT&T analog carrier to, for instance a responding provider that utilizes another carrier, for instance, Sprint. Even if the interface could be accomplished, yet another barrier is the need to actively allocate use of resources between a party needing assistance, and a party willing to provide assistance, while still retaining the ability to service its own customers. Existing systems for call forwarding between call center locations do not provide for unrelated operations to rapidly and in near real-time set up and activate call transfer program or campaigns. An example of an existing system with such limitations is disclosed in U.S. Pat. No. 6,349,134.

There exists an acute need for a system and method that would allow various providers to share capacity for addressing customer inquiries by providing mutual assistance in times of need. Of particular need is a system that allows rapid activation of mutual assistance, minimizes communications connectivity issues, and does not require a provider of mutual assistance to disrupt its own customer service activities or displace its customer service agents. If a system for providing mutual assistance between companies with trained customer service agents, particularly for utilities that experience high call volumes during certain events were available, customer service could be more efficiently provided.

BRIEF SUMMARY OF THE INVENTION

The invention is embodied in a method for providing a clearinghouse that allows providers to offer the use of excess customer service capacity to other member businesses who are in need of customer service capacity in excess of the requesting business' present capacity. In order to function effectively as a mutual assistance system, responding providers register availability of call capacities, designated times, and volumes, and a requesting user agrees to purchase a given capacity schedule. Through the mutual assistance clearinghouse, the requesting user and the responding provider agree, prior to initiating the automated routing of customer service contacts, to the contact metrics to be routed through the mutual assistance clearinghouse, and further agree as to the control parameters that will govern the automated routing of customer service contacts. Alternatively, a prospective responding provider may register the availability of customer service capacity to prospective requesting users.

Once an agreement is reached between the requesting user and a responding provider, customer service contacts from the requesting user are routed to the responding provider. The responding provider then responds to the customer service request as if an agent of the requesting user. In a preferred embodiment, a uniform interface, i.e., a universal interface screen, or a universal interface, is provided by the requesting user to all responding providers, so that a customer making a customer service request is unaware that the responding provider is acting as an outside agent of the requesting user.

Another embodiment is a system of routing customer contacts from the contact interface with the requesting user through a contact routing system to a contact interface of the responding provider. The contact routing system may thus utilize all available customer service capacity of the requesting user, and channel any overflow of customer service contacts to the responding provider contact interface. A further embodiment is a universal interface that allows access to a database that provides information regarding the requesting user's customers to the responding provider, and allows the responding provider to provide information regarding the outcome of the customer service contact to the requesting user.

BRIEF DESCRIPTION OF THE DRAWINGS

For a fuller understanding of the nature and advantages of the present invention, reference should be had to the following detailed description taken in connection with the accompanying drawings, in which:

FIG. 4A-C show an alternative process flow for the mutual assistance routing system;

FIG. 5A-H show sample screens available to a customer service agent or administrator utilizing the mutual assistance routing system;

FIG. 7A-B show an exemplary call data record.

DETAILED DESCRIPTION OF THE INVENTION

Figure 1:
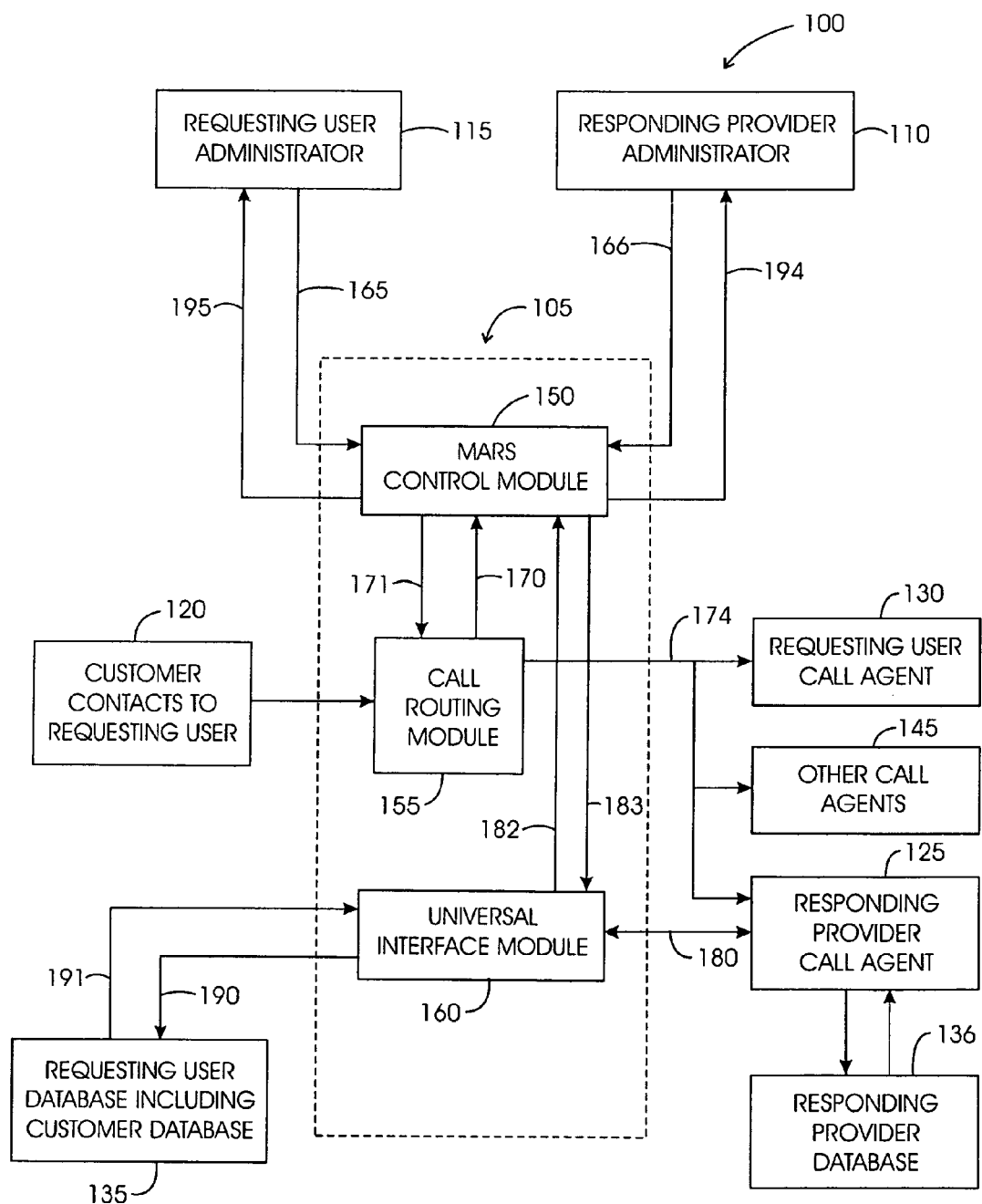
FIG. 1 shows a block diagram of the components of the mutual assistance routing system.

Disclosed herein is a new system and method for providing an interface that allows the mutual sharing of resources devoted to customer service. As shown in FIG. 1, the basic structure of an automated system, 100, for sharing customer service resources is shown. Block 105, is the mutual assistance routing system, MARS module. In the operation of the disclosed system, the MARS module is in communication with requesting users, responding providers, customer service agents, databases, including a database controlled by the requesting user, and customers who contact the requesting user.

Responding providers are subscribers to the MARS system who at time to time may make available to the MARS system customer service resources that the responding provider has available. Responding providers are embodied as utility companies, i.e. responding utility providers. Block 110 represents the administrator for responding providers. Requesting users are subscribers to the MARS system who from time to time may request assistance from other subscribers to the MARS system who are making available customer service resources that the responding provider has made available to other MARS subscribers. Requesting users are embodied as utility companies, i.e. requesting utility users. Block 115 represents the administrator for requesting users.

Block 120 represents a body of one or more customers who may seek assistance from customer service agents available through the MARS system. Customers at block 120 are those customers who contact a requesting user at a time when the MARS system has been activated, e.g., place a telephone call to the customer service contact number of the requesting user during a time when customer service requests exceed the capacity of customer service available without utilizing the MARS system. Block 125 represents customer service capacity of the responding provider made available to the customers of the requesting user through the MARS module. Block 130 represents customer service capacity available from the requesting user, capacity that may be utilized, according to certain metrics determined by requesting user administrator and responding provider administrator 115. Call metrics available for the administrative interface include such data as operator codes, routing times and routing priorities, and other administrative values. for Block 135 represents a database of information regarding the requesting user and or the customers of the requesting user, conditions affecting customer service, and other information relevant to the business of the requesting user, namely information necessary to effectively provide customer service assistance to customers of the requesting user. Other databases may be provided, whether directly accessed by the universal interface module, or only through, for instance responding provider call agents, such as responding provider database 136.

A preferred embodiment of the MARS system is to manage the customer service contacts of a potential requesting user during time of emergency, or otherwise busy time periods. It is recognized that customer service contacts are typically made during periods of emergency by means of telephone. A telephone is generally understood to be an electronic communications device that is adapted to send and receive audio based communication. The traditional telephone is a hard-wired transmitter/receiver that interfaces initially with the telecommunications system via a wired connection. Presently a variety of wireless audio and data communications are widely utilized, often as digital analogs of the traditional telephonic transmitter/receiver. It is also recognized that the MARS system operates nearly as effectively no matter what the means of contact a customer has with a requesting user, whether by email, internet or web based chatting, in person or by other means. For the purposes of this application, customer service contacts may be accomplished by nearly any means, and as used herein the terms "customer service contacts" and "customer service calls," e.g., telephonic calls to the requesting user, are interchangeable for the purposes of this application with any means through which a customer makes contact with a requesting user.

Returning now to block 105, the MARS module is comprised of three interacting subsystems: the MARS control module, 150, a call routing module, 155, and a universal interface module, 160. Mars control module 150 comprises a control system that interacts with and integrates information provided by and provided to requesting user administrator 110 and responding provider administrator 115. The MARS control module also integrates data transferred to and from the call routing module 155 and universal interface module 160.

Subscribers to the MARS system agree to share customer contacts on mutually agreeable terms and conditions. Prior to the initiation of steps necessary to activate the sharing of customer contacts through MARS, various subscribers to the system negotiate the terms and conditions through which they might in the future share customer contacts. If for instance, there are 50 subscribers to MARS, any particular subscriber may intend to share resources with only a subset of those other subscribers, for instance, 10 other subscribers. Nonetheless, the pool of subscribers active in the MARS system may at some point enter into a mutual assistance sharing agreement.

Two subscribers who are preparing to share resources through MARS will initiate contact with one another. For instance, a requesting user administrator 115 may contact a responding provider administrator 110 on an occasion when the customer service resources of the requesting user are insufficient to handle the demands of requests for customer service contacts, i.e. calls from the customer pool 120. The requesting user administrator 115 and responding provider administrator 110 agree to control parameters, and these control parameters are logged into the MARS control module 150 as shown by arrows 165 and 166. These control parameters determine the process through which the incoming customer contacts will be routed. Control parameters 165 will include, for instance, the number or percentage of contacts to the requesting user that are to be routed to the responding provider, the type of contacts, i.e. outage reporting or emergency, that might be routed to the responding provider customer service agents, and the type of contacts that are managed by the customer service agents of the requesting user. Control parameters 166 will include, for instance, the telephone numbers through which the transferred calls are to be routed, the number of agents available, and the length of time those agents are to be available. Once those control parameters are set, the requesting user administrator can toggle the MARS system into an "on" condition, activating the MARS module for rerouting customer service contacts directed to the requesting user.

In an alternative embodiment, either a requesting user or a responding provider may register or otherwise announce the need for and or availability of customer service capacity on the disclosed system. Moreover, the offer and acceptance of the parameters of mutual assistance may be entered through a feature of the MARS control module.

Upon activation of the MARS call sharing system, call routing module 155 receives contacts from customers 120, and based on control parameters determined by the requesting user administrator, call routing module 155 determines how a particular call should be routed. Call routing by call routing module 155 may route an incoming call to the customer service system of the requesting user, to the customer service capacity of a responding provider made available through MARS, or to some other destination, for instance, to an emergency contact. In order to effectively determine the proper routing of a particular customer service contact, the call routing module 155 must interact with the MARS control module to determine a number of parameters, including, for instance, call wait times, availability of customer service capacity on the requesting user's system, volume of calls transferred per particular time period, and availability of customer service capacity from responding provider. When receiving an incoming customer service contact, the call routing module transfers information, i.e.

call metrics regarding the incoming contact, to the MARS control module 150, as shown by arrow 170. Mars control module 150 then integrates the information regarding call metrics from the call routing module 155, in conjunction with control parameters set by the requesting user administrator and responding provider administrator, and based on the integration of the available call information and call parameters, determines the proper routing of the incoming customer service contact. This information is provided to the call routing module 155, as shown by arrow 171. Based on the information provided by the MARS control module 150 through arrow 171, the call routing module 155 determines the proper routing of the incoming customer call, whether to the customer service agents of the requesting user at 130, the customer service agents of the responding provider, at 125, to emergency personnel, or to other destinations as shown in an exemplary fashion at block 145. Routing of an incoming customer call through the call routing module 155 is shown as arrows 174.

Universal interface module 160 provides an interface, e.g. a web based computer screen, for customer service agents of responding providers that is readily recognizable by customer service agents of the responding provider as being distinct from the native interface of the home business of the responding provider customer service agents. Specifically, the customer service agents of the responding provider are alerted to the status of the incoming customer service contact as a contact originating through the MARS module. For instance, the name of the requesting user can be displayed, along with an information screen that is distinct from the home screen of the responding provider. The universal interface provides information necessary to manage the customer contact to responding provider service agents 125. The customer service agents of a responding provider can enter information that was obtained from customer contacts through the universal interface into the MARS system, with this interchange of information shown by arrow 180.

The universal interface is universal for calls originating through the MARS module in that all contacts originating through the MARS module utilize a MARS universal interface screen. No matter which requesting user's customers are channeling calls through the MARS module, the universal interface screen announces the identity of the customer contact, along with other pertinent or necessary data regarding the customer. Moreover, the provision of the universal screen minimizes the need to retrain customer service agents providing mutual assistance. Those agents contacted through the universal interface screen of the MARS module will recognize the universal screen and be familiar with the arrangement of information provided by the universal interface screen and utilization of the information provided to or from the universal interface screen.

The universal interface module provides information, shown as arrow 182, i.e. call metrics, received through the customer service contacts managed by the customer service agents of the responding provider to the MARS control module. Based on the control parameters determined on activation of the MARS module, the MARS control module provides information, shown by arrow 183, to the universal screen module to assist the customer service agent in dealing with the incoming customer service contact. The universal interface module also is in communication, as shown by arrows 190 and 191, with the requesting user database 135, with that database providing important information necessary for managing the customer service contact, for instance, customer name, location, account number, and during periods of emergency service interruption, projected service restoration times, i.e. estimated restoration time (ERT). Information transferred from database 135 is shown as arrow 191. Based on information obtained during the processing of the customer service contact by the responding provider, information derived during the customer service contact is transferred by means of the universal interface module back to the requesting user database, as shown by arrow 190. Such information could be in the form of, for instance, generation of a trouble ticket, notification of customer contact, updated personal information, or payment information.

Through the MARS control module, both the responding provider administrator and the requesting user administrator are able to monitor the call metrics of customer contacts handled by the MARS system. As shown by arrows 194 and 195, the MARS control module may make available to the responding provider administrator and the requesting user administrator, respectively, information useful in monitoring the efficacy of the mutual assistance program. It is a great advantage of the MARS system, and an advantage previously not available, that the responding provider administrator and the requesting user administrator are able to dynamically alter relevant control parameters, as in arrows 165 and 166, in order to most efficiently utilize available customer service agents. A wide variety of variables may be regulated through setting of control parameters by either a responding provider administrator and or a requesting user administrator. Examples of control parameters envisioned by the disclosure herein include the provision for a call script, a list of frequently asked questions, allocation of customer contacts between responding providers by share or priority, emergency caller information, number of agents to be provided, all caller messages, and customer service agent notes.

An advantage of the presently disclosed system an apparatus is the ability to respond to changing condition by altering the call forwarding parameters. For instance, an event may lead to activation of a MARS routing, but conditions during the events change. Thus, the initially anticipated customer service requirements may be far in excess of those anticipated. In one example, a responding provider may discover that the provider now requires additional resources itself. The MARS administrative interface allows a responding provider to reallocate its resources, and possibly set up a back-up responding provider if the need is eminent. Moreover, if the event subsides prior to when expected, the requesting user)s) can cancel their requests for assistance. The MARS administrative program allows users to update allocation and shared resources in near real-time, or preferably in real-time.

It should be recognized that the individual components of MARS module 105, MARS control module 150, call routing module 155, and universal interface module 160 are shown as distinct blocks in FIG. 1 for the purposes of emphasizing the functionalities of the components of the MARS module. Nonetheless, such representation of the MARS module functionality is not meant to represent distinct physical components of the MARS module, as the physical components of the MARS module may be intricately intertwined. As such, the MARS module exists as a combination of software and hardware and may physically be separated by great distances. Those skilled in the art of telecommunications will recognize that the physical hardware and control software can be created without undue experimentation in order to implement the MARS system functionality.

Figure 2:
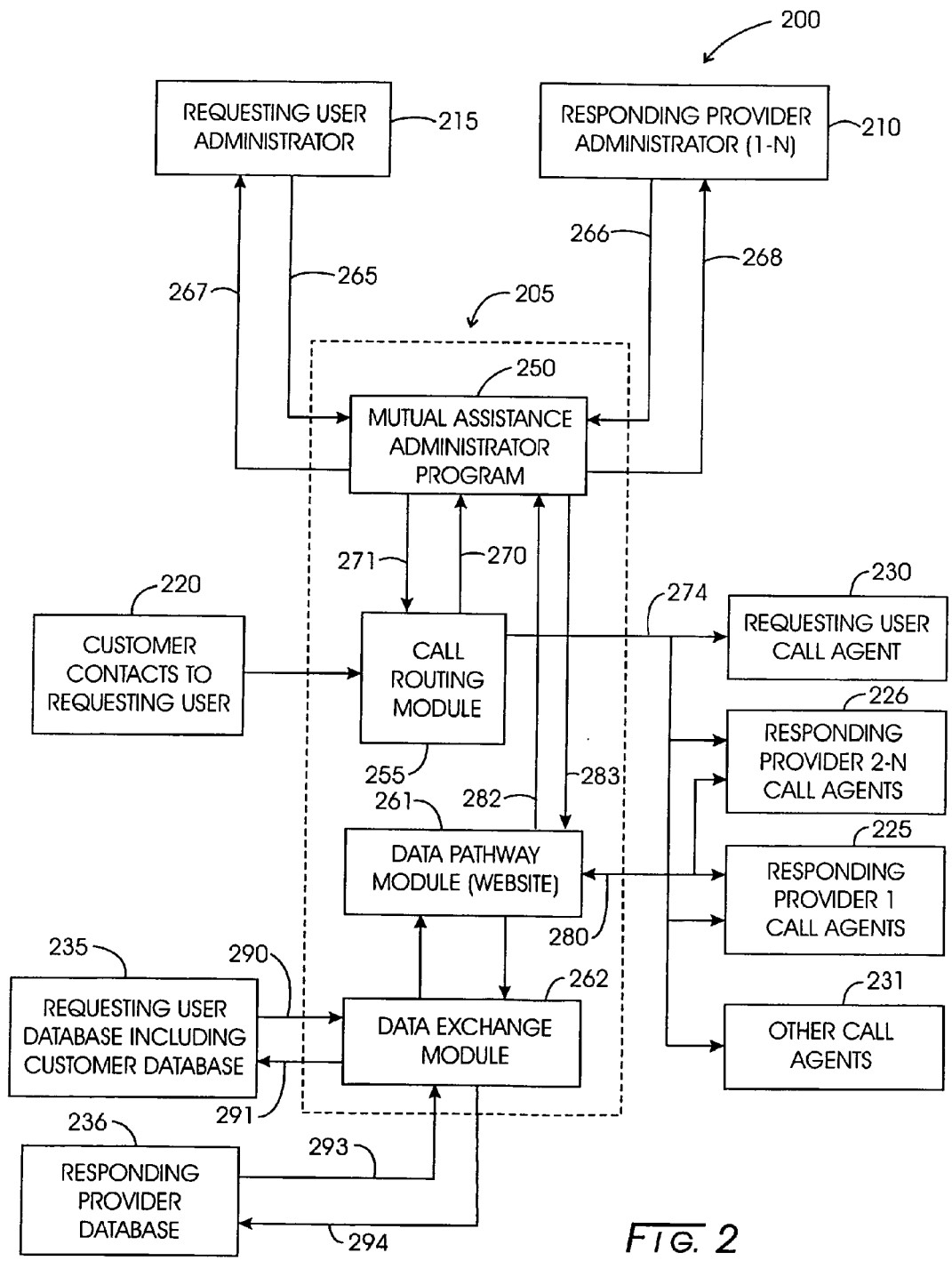
FIG. 2 shows an alternative arrangement of the mutual assistance routing system.

An alternative embodiment of the general outline of the MARS system is shown in FIG. 2. The basic structure of an automated MARS system, 200, for sharing customer service resources is shown. Block 205 is a mutual assistance routing system, MARS module. As shown in FIG. 2 there may be one or more responding providers available to a requesting user, such being indicated as responding provider 1 to N. Block 210 represents the administrator for responding providers 1-N. Block 215 represents the administrator for a particular requesting user. Block 220 represents customers of the requesting user who may seek assistance from customer service agents available through the MARS system. Block 225 represents customer service capacity of the responding provider #1 made available to the customers of the requesting user through the MARS module, while block 226 represent responding providers N+1 to N. Block 230 represents customer service capacity available from the requesting user—capacity that may be utilized according to certain metrics determined by requesting user administrator and responding provider administrator 215. Block 235 represents a database of information regarding the requesting user and or the customers of the requesting user.

The MARS module 205 is comprised of four interacting subsystems, the mutual assistance administrator program 250, a call routing module 255, a web accessible data pathway module 261 and a data exchange module 262. MARS mutual assistance administrator program 250 comprises a control system that interacts with and integrates information provided by and provided to requesting user administrator 210 and responding provider administrators 215. The mutual assistance administrator program module 250 also integrates data transferred to and from the call routing module 255, and data transferred to and from the data pathway module 261 and a data exchange module 262.

As previously described, a requesting user administrator, as at 215, may contact one or more responding provider administrators, as at 210, on an occasion when the customer service resources of the requesting user are insufficient to handle the demands of requests for customer service contacts, i.e. calls from the customer pool 220. The requesting user administrator 215 and responding provider administrators 210 agree to control parameters, and these control parameters are logged into the MARS control module 250 as shown by arrows 265 and 266. In addition, information may be passed to requesting user administrator and responding provider administrators through the MARS control module 250 as shown by arrows 267 and 268.

Upon activation of the MARS call sharing system, call routing module 255 receives contacts from customers 220, and based on control parameters determined by the requesting user administrator, call routing module 255 determines how a particular call should be routed. Call routing by call routing module 255 may route an incoming call to the customer service system of the requesting user as at 230, to the customer service capacity of responding providers made available through MARS as at 225, 226, or to some other destination, for instance, to an emergency contact as at 231. When receiving an incoming customer service contact, the call routing module 255 transfers information, i.e. call metrics regarding the incoming contact, to the mutual assistance administrator program 250, as shown by arrow 270. The mutual assistance administrator program 250 then integrates the information regarding call metrics from the call routing module 255 in conjunction with control parameters set by the requesting user administrator and responding provider administrator, and based on the integration of the available call information and call parameters, determines the proper routing of the incoming customer service contact. This information is provided to the call routing module 255, as shown by arrow 271. Routing of an incoming customer call 220 through the call routing module 255 is shown as branched arrows 274.

Data pathway module 261 provides an interface for customer service agents of responding providers that identifies the business of the requesting user, and allows for the responding provider to utilize the data pathway module interface to enter data obtained during the call. A universal interface screen, e.g., a web based configurable computer screen, is provided to display the relevant data to the customer service agents of responding providers (225, 226) that are necessary to manage the customer contact. The customer service agents of a responding provider can enter information obtained from customer contacts through the universal interface into the MARS system, with this interchange of information shown by arrow 280. The data pathway module 261 directs data through data exchange module 262, so that data is stored in databases 235 and 236 maintained for or by the requesting user and responding providers. The data pathway module provides information, shown as arrow 282, i.e. call metrics, received through the customer service contacts managed by the customer service agents of the responding provider to the mutual assistance administrator program, 250. Based on the control parameters determined on activation of the MARS module, the mutual assistance administrator program 250 provides information, shown by arrow 283, to the data modules 261, 262 to assist the customer service agent in dealing with the incoming customer service contact. The data exchange module also is in communication, as arrows 290, 291, 293 and 294, with the requesting user database 235, and responding provider database(s) respectively.

During events such as a natural disaster, product recalls, or other civil disruption, for instance a missing person alert utilities, banks, transportation systems, health departments, government agencies, and non-governmental entities such as the Red Cross are prone to experiencing pronounced increases in incoming customer contacts, such that during such events their customer service resources are overtaxed. Either by prior agreement, or agreement reached through the MARS administrative interface, customer service resources can be shared. In most situations, different enterprises within an industry will best be able to utilize a universal customer service interface to allow for the sharing of customer service resources. Following a hurricane, for example, a property insurance company in the affected zone may not be capable of responding effectively to incoming customer contacts. An affiliated insurance company in a distant location, that normally has a separate customer service operation can agree to share resources through MARS to assist the affiliate. MARS enables the sharing of resources to be effectively completed, and provides a mechanism for exchanging those resources, either through an in-kind sharing, or through a payment for service rendered. Likewise, health insurers suffering a hardware catastrophe, or a public health emergency could share resources with affiliates or similarly organized health insurance organizations unaffected by the event. Governmental agencies may need assistance with public safety emergency announcements, and in coordinating the response to those emergencies.

The control system of the MARS module is demonstrated in FIGS. 3 and 4. When a customer contact telephone call is connected to the system when the MARS module is active, the destination of the call must be properly routed before the call contact from a utility customer to the MARS contact number is disconnected. Essentially the MARS module accepts incoming calls from any carrier, and then manages the transfer and reconnection of that call to another telephonic connection, no matter what telephone carrier accepts the call connection.

Turning now to FIG. 3, a detailed block diagram of the MARS call routing system is disclosed. Beginning with the detection of a MARS transfer request at block 701, (see, e.g., block 443 at FIG. 6A), arrow 702 is followed to block 710, wherein HL058, the MARS transfer announcement, is provided to the caller alerting the customer that a transfer is to occur, and arrow 712 is followed to a command at block 714, initiating a MARS route request. Arrow 716 is followed to block 718, wherein it is determined whether a successful MARS routing is feasible, or whether the caller should be returned to the MARS default route. At block 716 the MARS routing system queries resources for accomplishing a successful transfer to determine whether the router can confirm that a transfer is predicted to be successful through available connections. If a successful transfer through the MARS call routing module is accomplished (see arrow 171 of FIG. 1) arrow 719 is followed to block 730, where a successful transfer indication is provided, and arrow 731 is followed to block 732, where a switch of the connections between the requesting user and the responding provider through MARS is attempted, for instance, by initiation of a trombone bridge or "SUMMA" type switch transfer (see arrow 174 of FIG. 1).

Returning briefly to block 718, arrow 720 is followed to block 722 if a successful transfer indication is not received, for instance if an error, direct connection down indication, or trying time limitation has been reached, arrow 724 is followed to block 726, routing the call to the MARS default route.

The system as conceived generally utilizes a type of switching protocol sometimes associated with the term SUMMA, which is defined as a programmable communications switch. Typically the system utilizes a "trombone" or "bridge transfer" protocol when transferring telephone calls. A trombone transfer maintains the original connection during the transfer process, so that the number of calls dropped during a call transfer is minimized. As disclosed herein, a SUMMA transfer is equivalent to a trombone transfer. Other switching protocols are adaptable to use with the system, and would be necessary for certain other telecommunications connections, such as over internet text chatting.

Figure 3A:
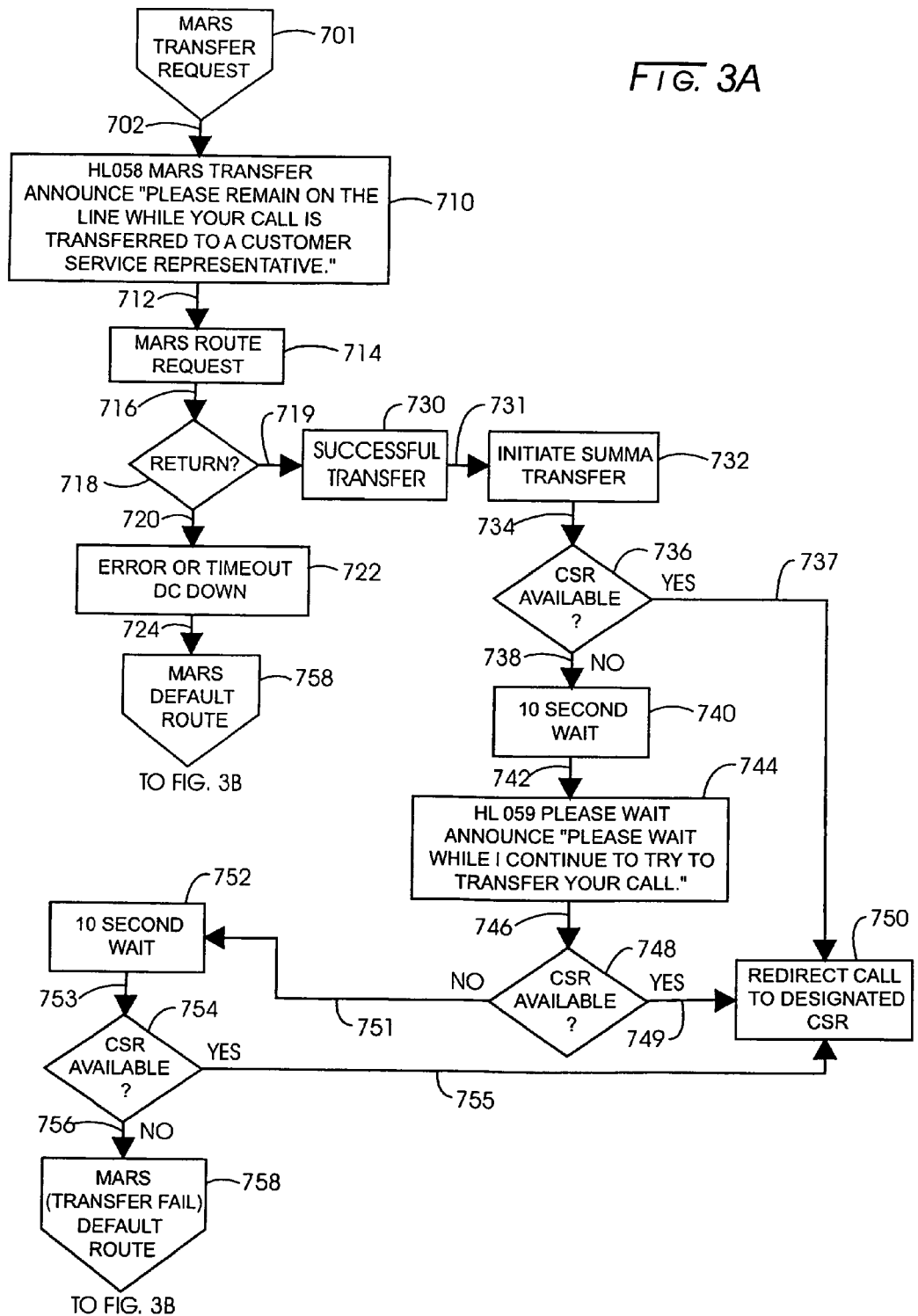
FIG. 3A-B show a process flow for the mutual assistance routing system.

For successful transfers, from block 732, arrow 734 is followed to block 736 wherein a query is presented whether a customer service representative (CSR) is available. If a CSR is available, arrow 737 is followed to block 750, whereby the incoming contact is rerouted to the designated CSR. The CSR of the designated responding provider then utilizes the MARS system interface, as shown by example in connection with FIG. 5, to assist the customer. When a CSR is not immediately available, the MARS transfer system can be configured to make additional attempts to transfer the call to a CSR. As shown in FIG. 3A, two additional attempts are provided. When no CSR is available at block 736, arrow 738 is followed to block 740, and the system provides a 10 second wait before attempting another connection. A 10 second wait has been empirically determined as a typically tolerable wait time, before it is necessary to reassure a customer that the call has not been disconnected. Longer pauses at wait blocks such as block 740 may lead to customer frustration, or to hang up disconnections by customers who mistakenly believe that the MARS system has itself disconnected. Shorter pauses are possible, but the shorter the pause the more likely that there will not be a change in status of CSR availability. After the pause at block 740, arrow 742 is followed to block 744, and a "continue waiting" announcement is provided, following arrow 746 to block 748, wherein a second attempt is made to connect to a CSR. If a CSR is available, arrow 749 is followed to block 750. If no CSR is yet available, arrow 751 is followed to block 752, where another pause period of, for instance, 10 seconds, is provided. Although not shown in FIG. 4A, another announcement could be made indicating that the connection is still being tried, a longer pause allowed, or the caller given the option to keep trying or follow the default route. If, following arrow 753 to block 754, a CSR is available, the transfer is made, following arrow 755 to block 750. As shown in FIG. 3A, if after three connection attempts, as at arrow 756, no CSR is available, block 758 leads to the MARS Transfer Fail default route described in FIG. 3B.

One goal of the system and apparatus is to maximize the reliability of call transfers and reroutings. If a MARS route request at block 718 does not return a successful indication, rather than risk dropping the contact, the MARS default path is followed, with such path not providing as robust of transfer as the transfer shown in FIG. 3A. In FIG. 3A, and identified route transfer is attempted. In the MARS default pathway, if the primary transfer path is unsuccessful, a fail-over contact path is attempted, for instance a coded default telephone contact number. The Mars default route is conceived as a routing pathway that will function under adverse conditions.

Figure 3B:
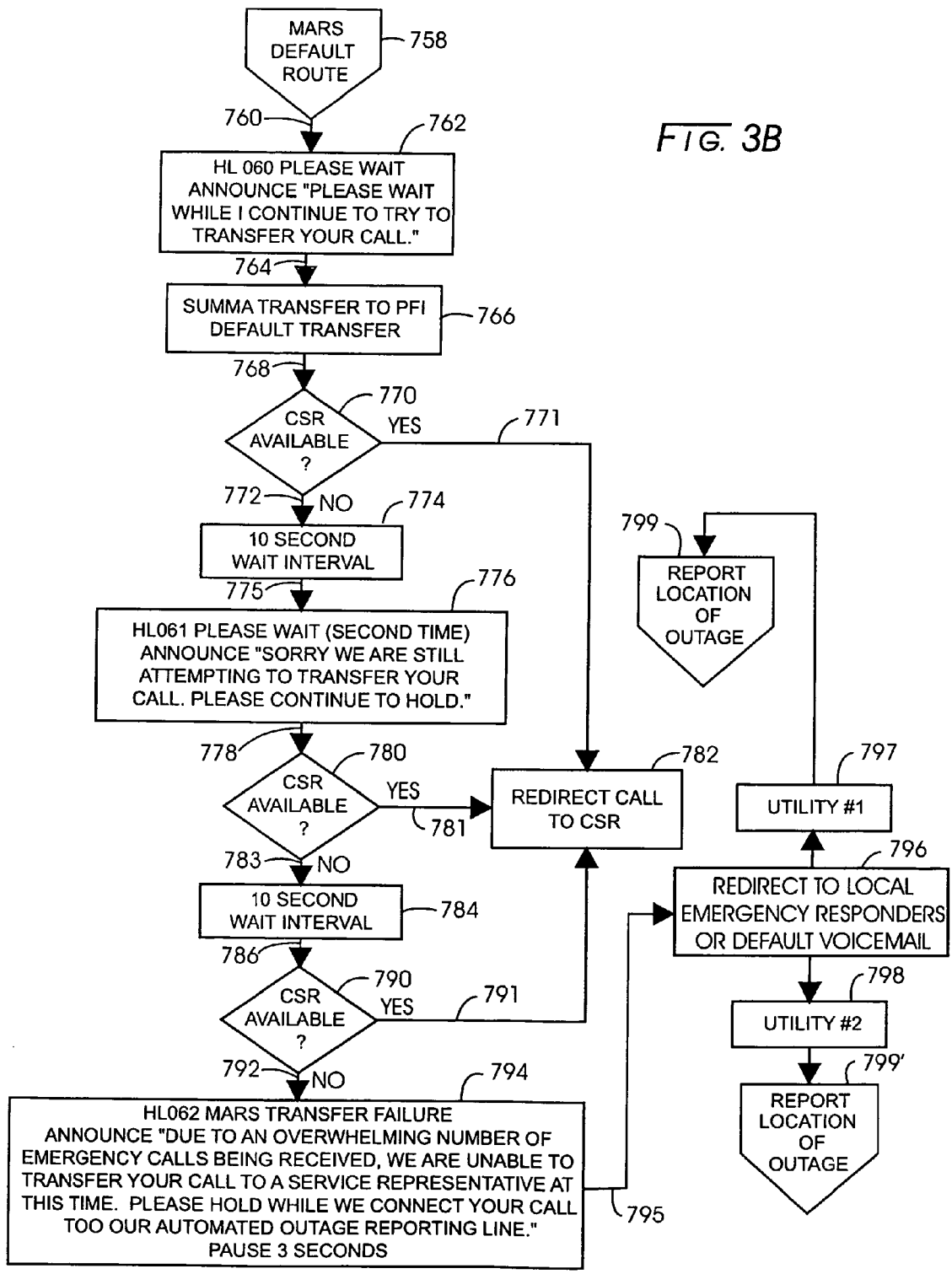

Turning to FIG. 3B, beginning with block 726, the MARS default route, arrow 760 is followed to block 762, where wait announcement HL060 is provided. Different wait announcements may be provided to cue the customer that they are progressing through the MARS system rather than being caught in a fruitless return loop. Arrow 764 is then followed to block 766, wherein a SUMMA transfer to the PFI system is attempted as a default, and/or "last ditch" attempt to make a successful transfer. The PFI is shorthand for the "program function interface," i.e., the interface underlying the web interface disclosed in connection with FIG. 5. Following arrow 768 to block 770, a successful MARS routing is attempted. If such a successful transfer occurs, arrow 771 is followed to block 782, where the caller is redirected to a CSR of the responding provider. At block 770, if a successful transfer does not occur, arrow 772 is followed to block 774, and a wait period is allowed to expire. Subsequently arrow 775 is followed to block 776, and a second wait announcement is made, arrow 777 being followed to block 780, wherein a query is presented whether a CSR is now available. If a CSR is available, arrow 781 is followed to block 782, routing the incoming contact to the designated CSR. When no CSR is available at block 780, arrow 783 is followed to block 784, and the system provides another 10 second wait before attempting another connection. After the pause at block 784, arrow 786 is followed to block 790, wherein a final attempt is made to connect to a CSR. If a CSR is available, arrow 791 is followed to block 782. If no CSR is even yet available, the system is configured to cease further attempts at connection with arrow 792 being followed to block 794. At block 794 an announcement is made that the MARS transfer has failed. When the MARS transfer fails, the default route is not to disconnect the caller, but to return the caller to either an automated voicemail system, or to an outage reporting system, such as either a native system for the requesting user, or a HVCA system from either the requesting user, one or more responding providers, or third party. From block 794, arrow 795 is followed to block 796, where the call is redirected. Shown for example at block 796, either or two utilities, 797 or 798, for example, or other parties capable of taking a customer message receive the redirected call, and an outage report or emergency message is taken at block 799. It is a preferred embodiment of the system that in only an unusual circumstance will a customer simply be disconnected without having an opportunity to leave at least a voicemail message. Because in many circumstances, a life-threatening situation may be present for a subset of callers, making disconnection of any incoming call is undesirable.

Figure 4A:
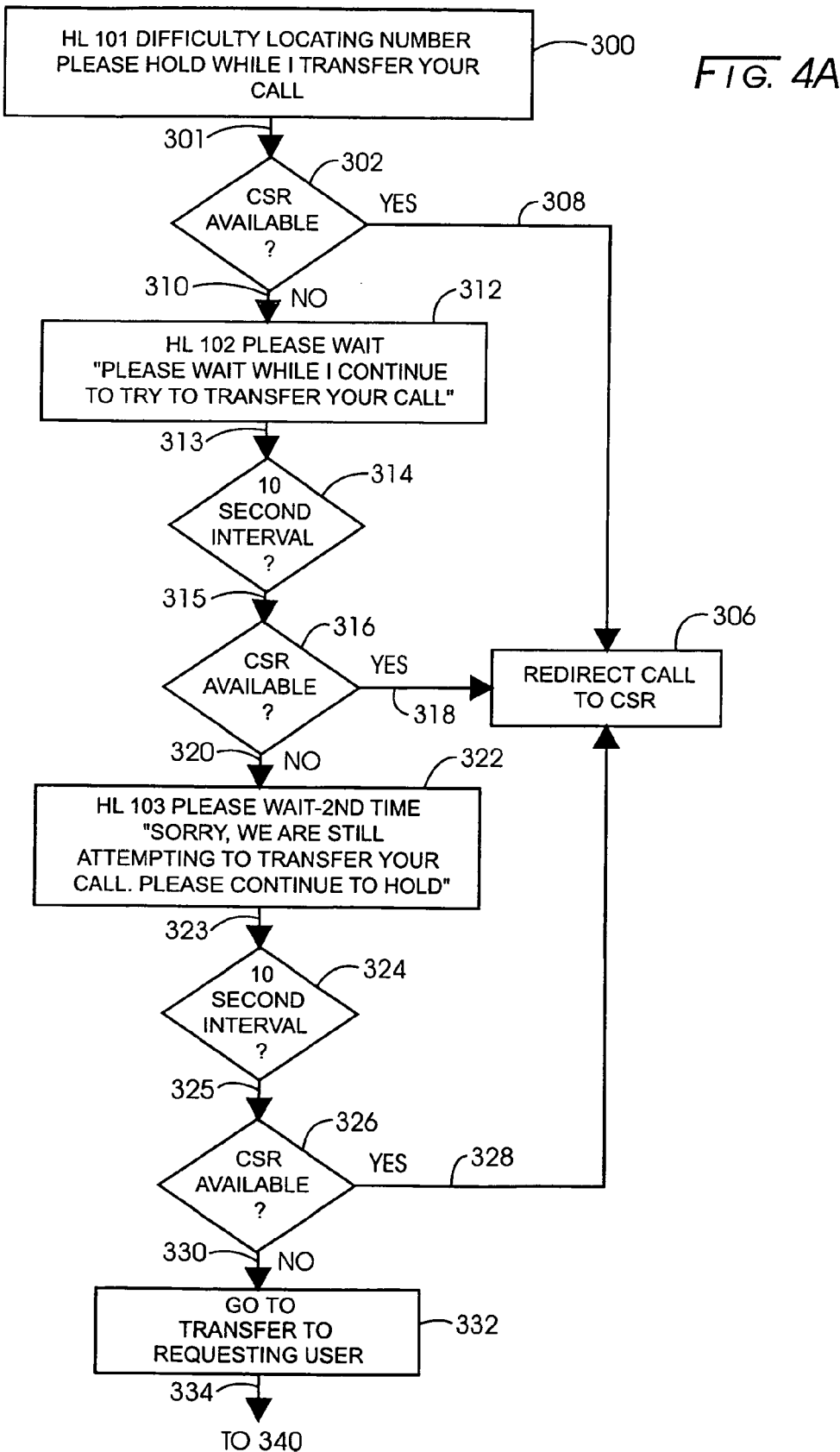

An alternative embodiment of the control system of the MARS module is demonstrated in FIG. 4 A-C. As illustrated in FIG. 4A, typically a transfer will be made from a customer of a requesting user to the customer service representatives of a responding provider (collectively all the additional CSRs made available through MARS). In one embodiment of the MARS system, the system functions as an overflow response system, so that incoming calls are only redirected to responding providers when no CSRs are available from the requesting user. Such an overflow system can operate to transfer to MARS only after 5 unanswered rings, for instance. In other situations, for instance, where a HVCA is active at the requesting user, a subset of all customers, or customers indicating that they need a live agent, or customers who are unable to navigate the IVR system may be routed to a live customer service representative, either a native agent, or one made available through MARS. When a call is routed through to MARS and the incoming call is not immediately connected to the customer service agents of the requesting user, as in block 300, an announcement is made to the caller that the call is to be transferred, whereupon arrow 301 is followed to block 302. At block 302, MARS determines whether a customer service representative is available at one of the responding providers. If a representative is available, at arrow 304, the call is redirected and connected to a customer service representative of a responding provider, at block 306. Arrow 308 represents the redirection of an incoming customer contact call to a customer service agent logged into the MARS system through a responding provider.

For purposes of this disclosure, a "native" system and "native customer service capacity" represent the system and customer service capacity that is normally available to an enterprise, without routing the customer service capacity through MARS. Thus native agents are familiar with the business and systems of a requesting user (for instance), and are familiar with their "home" customer interface.

If no customer service agent from a responding provider is available, as at arrow 310, another announcement is made, indicating to the caller that a retry to redirect the incoming call will be made, as at 312. A predeterminable wait period, for instance 10 seconds, is allowed to elapse, at 314, and a subsequent attempt to redirect the incoming customer call is made, at 316. If a representative is available, at arrow 318, the call is redirected and connected to a customer service representative of a responding provider, at block 306.

While two to three attempts to redirect an incoming call through MARS are typically made, the number of attempts is alterable depending on the needs of a particular subscriber to MARS. If no customer service agent from a responding provider is available a second time, as at arrow, 320, another announcement, typically different from the announcement at 312, is made, indicating to the caller that another retry to redirect the incoming call will be made, as at 322. A wait period is allowed to elapse, at 324, and a third attempt to redirect the incoming customer call is made, at 326. If a representative is available, at arrow 328, the call is redirected and connected to a customer service representative of a responding provider, at block 306.

As shown in FIG. 4A, if three unsuccessful attempts to redirect an incoming customer contact call through MARS are made, as at 330, the MARS module will attempt to bounce the incoming call back to the customer service contact for the requesting user, at block 332, rather than simply dropping the call connection. In the instance that a responding provider is unable to accept the redirected call, the customer contact call should eventually be transferred back to the requesting user, though arrow 334. The necessary contact information can be retrieved by accessing the requesting user database or data stored in the call data record, or predetermined by entry of the return or bounce contact number by the requesting user administrator when initiating the MARS module.

As described above, the number of attempts made before the call is bounced back to the requesting user contact may be determined based on the particular control parameters chosen by the requesting user administrator. An advantage of the system is that the parameter settings of the transfer are dynamic and can be changed at any time under the discretion of the administrator. The information regarding these parameters must be forwarded from the administrator to the equipment controlling the logic of redirection.

As described previously, data is collected regarding the transfer of incoming calls, and that collected data is passed through the data interface module discussed in connection with the disclosure of FIG. 2. A variety of other general and call specific data can be collected during the operation of MARS by recording various call metrics. Generally each customer contact being routed through the MARS module generates a call data record (CDR). The various CDRs may be made available to requesting users and responding provider administrators, allowing analysis of the efficiency, throughput, and customer outcomes of the operation of a particular MARS session. The CDRs generally and preferably provide for the outcome of redirection attempts being logged into the data interface module, the data to be collected by MARS, and are accessible additionally to the requesting user and or the responding provider. Outcome codes the status of redirection attempts include such data records as:

S=Successful Redirect
B=Redirect Busy
Q=Queue Timeout
H=Hangup During Redirect
M=Failed MARS Redirect
U=Successful MARS Redirect
O=Other Failure
X=Default Turning now to FIG. 3B, when an incoming call is redirected by MARS as at 334 of FIG. 3A, an attempt is made to reconnect the call to the agents of the requesting user, at block 340. Typically, three additional attempts are made to connect the incoming call to the customer service agents of the requesting user. At block 342, MARS determines whether a requesting user customer service representative is available. If a representative is available, at arrow 344, the call is redirected and connected to a customer service representative, at block 346. Arrow 348 represents the redirection of an incoming customer contact call back to a customer service agent of a requesting user.

If no customer service agent from a requesting user is yet available, as at arrow 350, another announcement is made, indicating to the caller that a retry to connect the incoming call to an agent will be made, as at 352. A wait period is allowed to elapse, at 354, and a subsequent attempt to connect the incoming customer call is made, at 356. If a representative is now available, at arrow 358, the call is redirected and connected to a customer service representative, at block 346.

If even after two attempts to connect an incoming call through MARS has been made, and no customer service agent is still available a second time, as at arrow 360, another announcement, 362, typically different from the announcement at 352, is made, indicating to the caller that another retry to connect the incoming call will be made. A wait period is allowed to elapse, at 364, and a final attempt to connect the incoming customer call to an agent is made, at 366. If a representative is available, at arrow 368, the call is redirected and connected to a customer service representative, at block 368. If no agent is available arrow 370 is followed, and an announcement is made indicating that the call will be disconnected, at block 372. The incoming call is then dropped (disconnected). As shown in FIG. 4B, the failure to transfer the call connection results in a dropped call, but other alternatives are available, such as to redirect the customer contact back to the requesting user's interactive call response system. Data indicating the outcome of the attempt at redirection and or reconnection may be logged into the CDR data bank for retrieval and analysis.

Figure 4C:
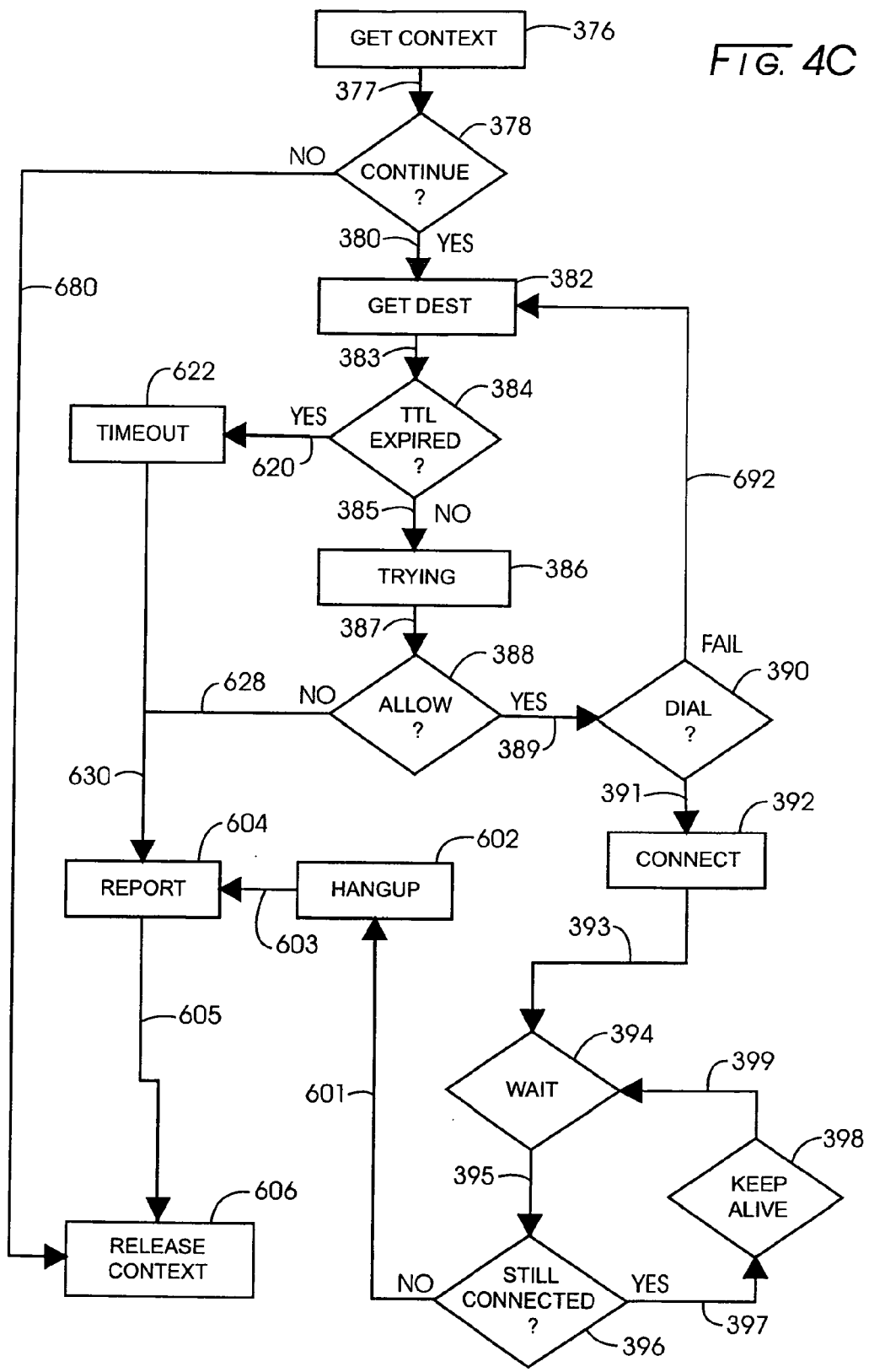

During the process of the call transfer, telephone switching equipment is controlled in a manner that serves to minimize dropped calls. As shown in FIG. 4C, the switching and transfer equipment are directed to make a number of queries useful for controlling the call transfer. At block 376, a GET CONTEXT command is issued in preparation for a transfer of the call connection. This command functions as a way of notifying the switching platform that a transfer of connection may be requested. The time to activation of the transfer is given in seconds and is assumed to start at the time the GET CONTEXT command was transmitted, while making an allowance for transit and processing times. The context is later used for subsequent transfer for a particular call. If transmittal of the GET CONTEXT command is successful, the response to the continuation query at block 378 is yes, as at arrow 380, whereby a GET DEST command issues at block 382. The GET DEST command issues when a connection transfer attempt is imminent. Data regarding the type of transfer to be executed are included in the GET DEST response. Once the GET DEST issues, the Trying Time Limit (TTL) timer starts when the response is transmitted and should be expected. Arrow 383 is followed to block 384, whereupon a repeating query is presented as to whether the TTL timer has expired. For so long as the TTL timer has not expired at block 384, following arrow 385, attempts at accomplishing the redirection of the call connection continue, and the TRYING indication at block 386 is issued on all attempts to transfer. The purpose of this TRYING indication is to stop a transfer if the destination has unexpectedly become unavailable. Following arrow 387, an ALLOW? query is presented at block 388. If the attempts at transfer receive an indication that the transfer will be allowed, as at 389, arrow 389 is followed and the call routing module will dial the number to which the call is to be transferred, at block 390. If dialing is successful at making a connection to the dialed number, arrow 391 is followed, and the CONNECT indication results, as shown in block 392. The CONNECT command is issued when the transfer is considered successful, and this result is subjective based on the instructions contained in the transfer control parameters. If a status indicating that the transfer was unsuccessful is returned (FAIL), the system must discontinue the transfer attempt. After failure to transfer, the router then returns to the GET DEST mode at block 382 via arrow 692.

Following successful connection, at block 392, a predeterminable wait period as at block 394 ensues. At predetermined periods, while the wait period continues, arrow 395 leads to a status inquiry being made to determine if the call is still connected, at block 396. If the call is connected, arrow 397 is followed, and a KEEPALIVE indication is made, representing a courtesy notification that the call connection is still in progress. As at block 398, when the KEEP ALIVE indication is made, arrow 399 loops back to block 394 and the wait period at 394 is again completed prior to determining whether the connection continues to be active. If the call is no longer connected, arrow 601 is followed and a HANGUP indication is made at block 602, representing a notification to the system that one of the call legs has terminated.

If the TTL timer at block 384 has expired, as shown by arrow 620, a TIMEOUT indication is issued at block 622 when the transfer attempts have either exceeded the TTL given with the destination ID or other limits placed on MARS application. While as shown in FIG. 4A three attempts may be made to redirect a customer service contact, even more attempts may be made as is prudent considering the circumstances. In the case of a HANGUP indication at 602 or of a TIMEOUT indication at block 622, a report is issued to one or more of the databases, following arrow 603 and 630, respectively, to response block 604 whereupon a record is created in the CDR, and arrow 605 is followed to block 606, resulting in a call release context. Because the call transfer mechanics can be complex, and the systems providing customer service agent connections may be overloaded, the handoff process as shown in FIG. 4C, or a similar one is carried out whenever a call transfer to a customer service agent is attempted.

A number of advantages are provided by the disclosed systems. The mutual assistance systems allow responding providers to leverage existing infrastructure that the provider may have available by allowing requesting users to employ that infrastructure during demand periods when the customer service capacity of a responding provider is more valuable when utilized by a requesting user than if that capacity is held in reserve by the responding provider. Thus, the responding provider more fully utilizes their existing capacity and derives revenue, goodwill, or prospects of future assistance.

Because, prior to the present disclosure, there existed no mechanism that provided different businesses a "currency" for exchanging services in order to provide assistance to other businesses, responding providers would need to engage in extensive training in order to effectively provide assistance. The trade literature of the electric utility industry reveals a number of instances where a major system outage induced electric utilities from different regions of North America to attempt to provide customer service assistance to utilities suffering an outage. By utilizing the distributed customer service representatives of a variety of related enterprises through the MARS system, the probability of an enterprise being able to effectively provide customer service is enhanced. Support from the customer service agents of responding providers can be provided without the need for travel by agents to the location of the outage, or the need to house those agents at a location remote from their home territory.

The disclosed system determines general parameters for exchange of customer service functionality prior to the actual need of customer service assistance, thus allowing responding providers to accept customer contacts from requesting users very quickly, in the matter of minutes, after a requesting user recognizes that customer service assistance is needed to adequately serve its customers. Moreover, the utilization of customer service assistance can be quickly controlled in near real-time or even in real-time in response to changes in call wait times, cost, and or projected demand, for instance, such that a requesting user can activate and or deactivate requests for assistance from a responding provider. Thus, the interface system and method provided are ready to be activated by a requesting user at nearly all times, essentially whenever mutual assistance would happen to be needed.

The mutual response system is preferably provided prior to the occurrence of a need for invoking the mutual assistance system. Thus, the system may be tested for reliability and functionality periodically in order to ascertain whether the mutual assistance system will properly function when activation is desired. Essentially the mutual assistance system can be utilized in any situation when communications within the requesting users home territory are compromised, whether through natural disaster, accident, unexpected systems failure, e.g. due to a computer malfunction or virus, civil disorder, strikes, unexpected unavailability of customer service agents, or national or regional emergency. While a preferred application of the mutual assistance system is to allow utility companies to share customer service agents in times of utility emergencies, the system disclosed herein is adaptable for use in a wide variety of emergencies and or operating disruptions.

The embodiments disclosed herein eliminate connectivity challenges across differing communications providers. For example, in the past telephone calls could not be reliably exchanged between utilities that utilized different long distance providers. Two parties seeking to provide mutual assistance could not connect customer calls to a customer service agent utilizing one telecommunications provider to an assisting agent utilizing a different provider. Simply asking a customer to make another call to a different number, or having an agent make another connecting call was not only unreliable, but also was time consuming and added additional expense. Even before the first customer service contact was to be taken by a responding provider, the responding provider customer service agents needed to be extensively trained in order to effectively provide assistance. The new system eliminates connectivity issues between subscribers of the mutual assistance systems because all connectivity is through the MARS communications interface. Thus, different computer systems and or telecommunications providers can be utilized.

Even if two parties could agree on general parameters for exchanging assistance prior to the initiation of a situation where a need for mutual assistance occurred, the MARS system allows system testing of the initiation of a requesting user and from a responding provider at any time prior to the occurrence of a disaster or high contact volume situation, allowing the call metrics and control parameters to be fine tuned through negotiation or consultation between those engaged in mutual assistance.

A further advantage is that the requesting user is provided a control option on routing to choose a bypass of the requesting user's interactive call response system in order to speed response to the call from a remote location. Customer activity reports can readily be provided for the originating requesting user and responding providers in terms of number of calls, number of call minutes, and the purpose of a call, for instance, or for a variety of other parameters that may be specified by either responding provider or requesting user administrators.

The new system provides a redundancy of customer service systems, for instance at a number of regional sites, essentially available in any country with available customer service agents that are able to communicate in the language of the requesting user's customers. The system is designed to be ready to be activated with very little notice, essentially being available in production-ready mode twenty four hours a day, 365 days a year. The system allows rapid activation and rapid response to customer service requests, whenever they may occur. Moreover, the system may be effectively controlled with control parameters amenable to dynamic updating, on a minute-to-minute basis, and without undue interruption of the call flows through the MARS system. The system is also readily adaptable to use in a wide variety of languages, and transformation of the MARS interface system into a Mandarin, Bengali, Spanish or French system can be provided by a simple activation of alternative announcements and cueing instruction on the interface.

The mutual assistance system disclosed provides a set of universal interactive screens for participants to utilize in providing customer service. If a responding provider utility has a customer service agent interface that differs from the mutual assistance interface, at most, an agent would need to utilize two different interfaces. Thus the expense of training assisting agents is minimized, for once they are trained to effectively utilize the mutual assistance interface, a brief refresher is all that would be required for agents to immediately utilize the MARS system and provide customer service assistance to the customers of a requesting user. By means of virtual connection of customer service agents, there is no need for those agents to travel to remote locations, incurring inconvenient and avoidable expense. It will be recognized that in many instances, where a widespread natural disaster has occurred, for instance a hurricane, the customer service agents of a requesting user may not have a viable physical location from which to work, or if agents had a physical location to which to travel, travel itself may be unavoidably difficult.

The system and method are further described in detail in the examples that follow.

EXAMPLES

Example 1

Administrative and Customer Service Agent Screens for a Web Based MARS System

Implementation of a MARS system as described in a preferred embodiment is through a system utilizing an internet, i.e. web based, interface. FIG. 5 A-H shows examples of such user interface screens. Such screens may be enabled utilizing a hypertext protocol (http), through a dedicated terminal system, such as a VT-100 emulator, or other local or networked software hardware combinations as are used in the telecommunications and computing industries. FIG. 5A shows an administrator login interface 1100 that would allow an administrator for a requesting user or responding provider to log into the MARS system and enter control parameters for sharing customer service contacts. A screen title is shown at 1110, while address interface panel, generally at 1120, allows for listing the http internet protocol (IP) address to which the system is directed, or entry of alternative IP addresses. As described earlier, an administrator is notified that the administrator is utilizing the MARS system by text or a logo presented at interface title panel 1130. An identifiable logo for the currently active MARS connection can be shown at panel 1130 to allow administrators for requesting users and responding providers to quickly recognize for which organization services are being provided. As shown in FIG. 5A, during the login process the MARS logo and title could be shown, along with, for instance, the home logo of the currently active organization, or the home organization. In other screens used by the system, for instance, a screen loaded by a customer service representative, interface title panel 1130 will typically list the identifying information for the requesting user, and optionally for the responding provider. In that manner a CSR would immediately recognize that the representative was providing services through MARS for the customers of a requesting user, and moreover is reminded of their own organization. Such reminders are extremely useful in a condition where CSRs are distributed across the world, are relatively mobile, and or are short-term employees.

Generally at 1140 is the entry interface for logging into the MARS control module. The administrator enters a user name in the user name entry field 1150, and a password in password field 1160. Transmission of entered information in fields 1150 and 1160 is initiated by activation of login button 1170. Although a single example of a log in screen is shown herein, depending on the security desired for entering the administrative function, additional passwords, i.e., two level passwords, or authentication questions may be utilized. Activity field 1180 allows the system to provide an indication of system activity, for instance, a wait condition. Finally, in the example shown in FIG. 5A, notice panel 1190 allows the system to provide feedback to a user through error messages, help messages, or directives on using the system, for instance. The administrative login screen as shown can readily be modified to provide additional features as desired by users of the system for particular applications.

FIG. 5B shows an interface 1200 that would allow an administrator for a responding provider to make available customer service capacity to a requesting user. It is through an interface such as interface 1200 that a responding provider makes an offer to provide customer service agents to other organizations. The responding provider, here identified as a "Responding Utility," can optionally either make available CSRs through the system interface on their own volition, or could also make agents available upon prompting by a requesting user, for instance by a telephone request, email, text message, or other communications means. Again, as in interface 1100, a screen title is shown at 1210, while address interface panel, generally at 1220, allows for listing or entry of the IP address to which the system is directed. The administrator is notified that the administrator is utilizing the MARS system by text or logo presented at interface title panel 1230. Generally at 1240 is the interface for entering customer service agent availability to other organizations through MARS into the control module (see 150, in FIG. 1). The administrator can choose from which requesting user (e.g., a utility) the responding provider will be willing to accept customer service calls in field 1242. Field 1242 can optionally allow entry of a requesting user code, for instance an IP address, the screen name of a requesting user, or a choice from options presented in a drop down menu associated with field 1242. As shown at field 1242, the hypothetical electric utility "Acme Power & Light" has been selected. The MARS administrative interface allows for entry of the contact information for which incoming customer contacts are to be routed at filed 1244. As shown in FIG. 5B, the contact is a telephone number to which telephonic communications are to be routed. Additional embodiments of the system envision allowing incoming customer contacts to arrive through a wide variety of communications systems, including for instance, instant messages, email, VOIP, internet enabled voice or text chatting, or text to voice connections, telephone, cellular telephone, utility toll free telephone, local telephone, long distance telephone, and voice over internet (VOIP), SMS text messages, facsimile transmission, video link, satellite telephone, radio telephone communications, and the like. Telephonic communications such as any telephone connection are a preferred embodiment for incoming customer contacts.

Field 1246 allows entry of the number of agents the responding provider will make available to the MARS system, with the number entered ranging from zero to more agents than are available. If a zero is entered in field 1246, then the number of agents can later be updated to a number greater than zero, making agents of the responding provider then available. If a very large number is entered, and said number is greater than the total agents the responding provider has available, then essentially all of the responding provider's available agents would become available to the system. It is expected that the number entered in field 1246 would be negotiated on an ad hoc basis by the user and providers to allow significant support to requesting users without seriously disrupting the normal operation of the responding provider. Field 1248 allows the responding provider to set a termination schedule for the forwarding of incoming customer contacts to its CSRs, if so desired, or optionally, the MARS forwarding system can be allowed to continue until manually deactivated by checking the box at field 1250. Transmission of entered information in fields 1242 through 1250 is initiated by activation of submit button 1270. Although entry of five different parameters are provided in the example interface screen shown in FIG. 5B, depending on the particular application or organization being served, provision for entry of additional parameters may optionally be provided. Activity field 1280 allows the system to provide an indication of system activity, and notice panel 1290 allows the system to provide feedback to a user for more efficient use of the system. The "Offer Agents" interface as shown can readily be modified to provide additional features as desired by users of the system for particular applications.

FIG. 5C shows an interface that would allow an administrator for a requesting user to set control parameters and activate sharing over the MARS system. FIG. 5C shows an interface, 1300, that would allow an administrator for a requesting user (e.g., a requesting electric utility) to request customer service capacity from one or more responding providers. It is through an interface such as interface 1300 that a requesting user makes a request for customer service agent assistance from other organizations. A screen title is shown at 1310, identifying the interface as the program activation screen, while address interface panel, generally at 1320, allows for listing or entry of the IP addresses. The administrator is notified that the administrator is utilizing the MARS system by interface title panel 1330. Generally at 1340 is the entry interface for initiating customer service agent utilization from other organizations into the MARS control module. The requesting user administrator can choose from which responding provider the requesting user will be willing to redirect incoming customer service calls in field 1342. Field 1342 is shown as allowing the requesting user to choose from options presented in a drop down menu associated with field 1342 with the hypothetical electric utilities "American" and "Acme Power & Light" being available. Field 1344 allows for selection of a distribution type. Field 1346 as embodied in FIG. 5C allows entry of the redirect call number, the number of agents the requesting user will utilize for particular responding providers, and an allocation distribution pattern.

A number of distribution protocols are available, including, for instance, a priority distribution and an allocation distribution. An example of a priority distribution is for incoming customer contacts to first be directed to the CSRs of the requesting user, and to then be redirected to the CSRs of responding providers by, for instance immediate ring through, after a 10 second "agent busy" delay, only on non-repeat callers, after inadvertent disconnection, or the like. Furthermore, a priority protocol could optionally allow sequential forwarding to a first responding provider, and overflow then being redirected to a lower priority responding provider. An allocation type distribution protocol could redirect calls based on a given number of incoming contacts, on a percentage basis, or on a responding provider cost budget basis. In the example shown in FIG. 5C, if distribution was selected on one version of a priority basis, contacts would first go to the requesting user CSRs, then to the CSRs of "American," and when all agents of "American" were busy, then to CSRs of "Acme."

Field 1346 allows for fine-tuning of a distribution protocol, for instance an allocation protocol. If an allocation type distribution protocol was chosen, in this example, the utility "American" could be selected, and the redirection contact number entered along with the number of representatives being contracted. Likewise, another entry could be made for the utility "Acme." As shown in field 1346, the entry under DIST is 100, i.e., 100% of incoming calls redirected to Acme. If a 90 were entered in the field associated with Acme, and a 10 entered into the DIST filed associated with American, then a percentage or ratio of incoming contacts to be redirected of 9:1 would be redirected to Acme and American respectively. FIG. 3C shows examples of allocation protocols for exemplary purposes. It should be recognized that a number of increasingly complex allocation protocols can be provided by modification of the program activation interface and the software system underlying said interface.

The administrative interface allows for selection of a broadcast announcement to be delivered to incoming customer contacts when incoming customer contacts are to be routed through the MARS system by entry of data into broadcast message field 1348. As shown in FIG. 5C, a message file (e.g., an MP3 audio file) can be identified, or optionally, a message announcement can be typed into a text to voice box associated with field 1348, whereupon the text is announced using a text to voice utility. Field 1350 allows selection of call back options, for example, calling electric utility customers back to report a projected service restoration time.

Field 1352 allows the responding provider to set a termination schedule for the forwarding of incoming customer contacts to its CSRs, or to allow redistribution of incoming contacts to continue until manually deactivated by checking the box at field 1354. Transmission of entered information in fields 1342 through 1354 can be initiated automatically, or by activation of a submit button (not shown in FIG. 5C. The "Program Activation" interface as shown can readily be modified to provide additional features as desired by users of the system for particular applications.

Figure 5D:

The MARS system is further embodied in a configurable frequently asked question (FAQ) interface that provides responses to a broad array of questions that may be expected from the customers of a requesting user. For instance, the requesting user is able to configure the questions and responses from an administrative screen, such as shown in FIG. 5D, thereby providing prepared responses to inquiries anticipated from customers of the requesting user, allowing the CSRs of a responding provider to assist customers that may be located in a geographically or culturally distant area. It is an embodiment of the system that the FAQ questions and responses will be optionally particularized for the event that resulted in activation of the MARS system. FAQ setup interface 1400, as shown, provides a screen title at 1410, identifying the interface as the FAQ setup interface screen, along with address interface panel, generally at 1420, and interface title panel 1430. Generally at 1440 is the entry interface for adding or editing questions and their responses. Search field 1442 allows both system administrators to search for questions and responses, with the administrator being able to determine if a question is present and edit the question and response, or a CSR to access the FAQ system and search for a response to a customer request. As shown in FIG. 5D, the FAQ set up interface is arranged in two columns, column 1444 listing questions, and columns 1446 listing projected responses. In the administrative set up portion of the FAQ interface, boxes such as box 1448 are editable text boxes, so that existing entries can be updated as the need arises. Likewise, fields such as box 1350 are editable text boxes. It is expected that a subset of FAQ question and answers will be prepared by the administrator prior to an event necessitating use of MARS. In addition, the FAQs can be updated during a crisis, in response to changing conditions. For example, the question 1448 is a question that an electric utility may anticipate after a serious natural disaster such as a hurricane, i.e., "Where can I get ice and clean water?" The response provided at 1450 may initially be "No water or ice is presently available. Boil all water before using." After relief efforts progress, the administrator could update the response to "All King's County fire stations are distributing ice and drinking water," and later, "Obtain ice at your grocery, and tap water is now safe to drink." Other questions and responses may be unexpected and need to be prepared as the need arises. For instance, if the utility Acme had never experienced a hurricane before, the response to question 1448''' of "how does Acme restore power to customer?" may need to be updated at field 1450''' as "Acme customers have never dealt with a hurricane before, we are awaiting assistance from our partners."

It should be emphasized that the FAQ interface is useful both to customers and to the customer service agents of responding providers. Responding provider agents may have never previously assisted customers from the requesting user, and therefore the requesting user administrator may provide information in the MARS associated FAQ that they do not typically need to provide to their own customer service agents. The utility of the MARS system over that of previous attempts to share CSRs is a unified interface so that CSR of a responding provider can rapidly recognize the location and association of customers by noting the title interface, such as title 1430, and then accessing a particularized series of FAQs to be able to quickly and efficiently serve the customers of another enterprise. The MARS system works most effectively when shared CSRs are associated with closely related industries, e.g. electric utilities, or utilities, airlines, or public transportation, rather than from unrelated industries, e.g. electric utilities and banking. Nonetheless, by providing a unified, efficient, and particularized FAQ interface, a trained CSR can effectively be retasked for a different industry by readily making available the information necessary for serving the customers of requesting users.

Figure 5E:
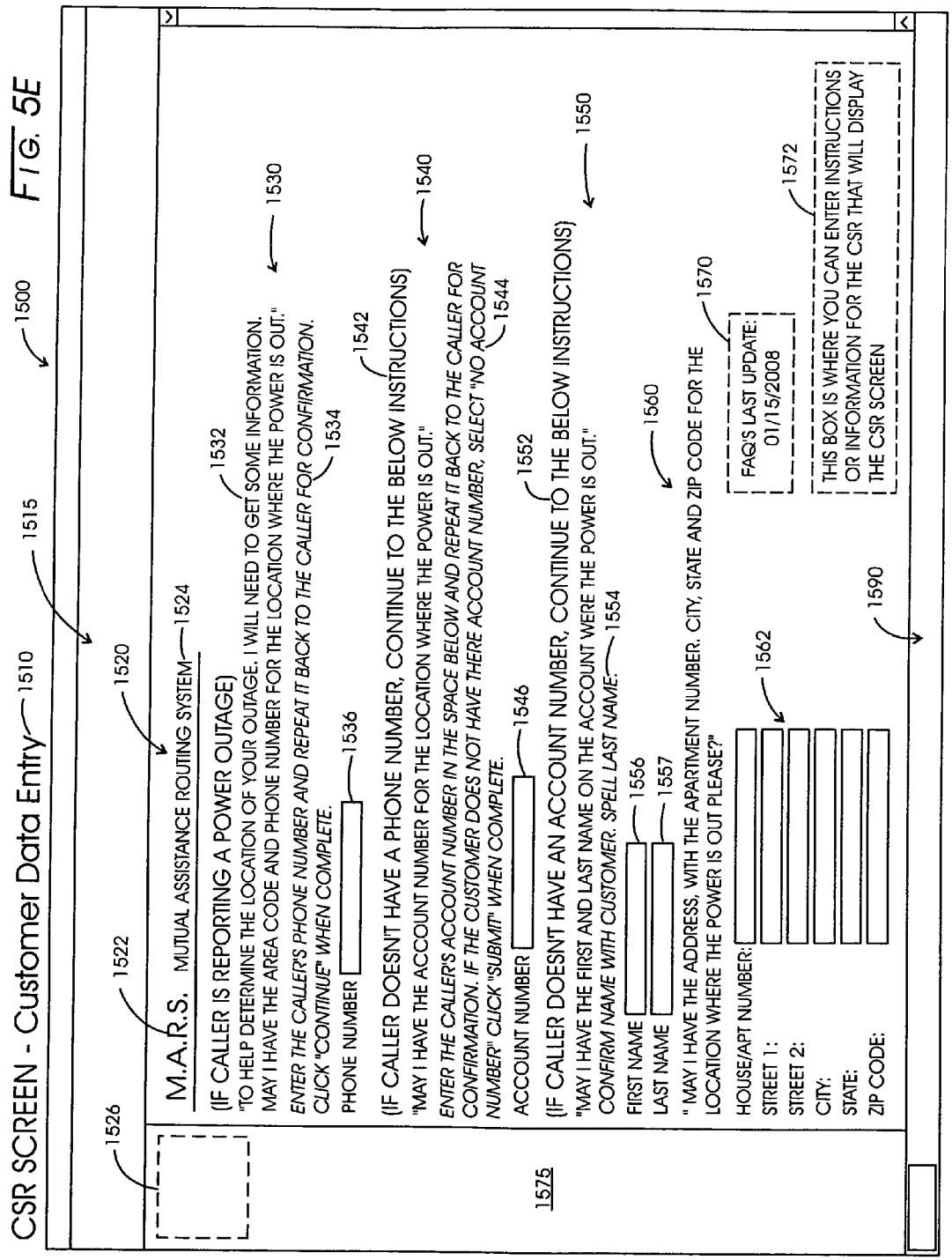
Figure 5G:
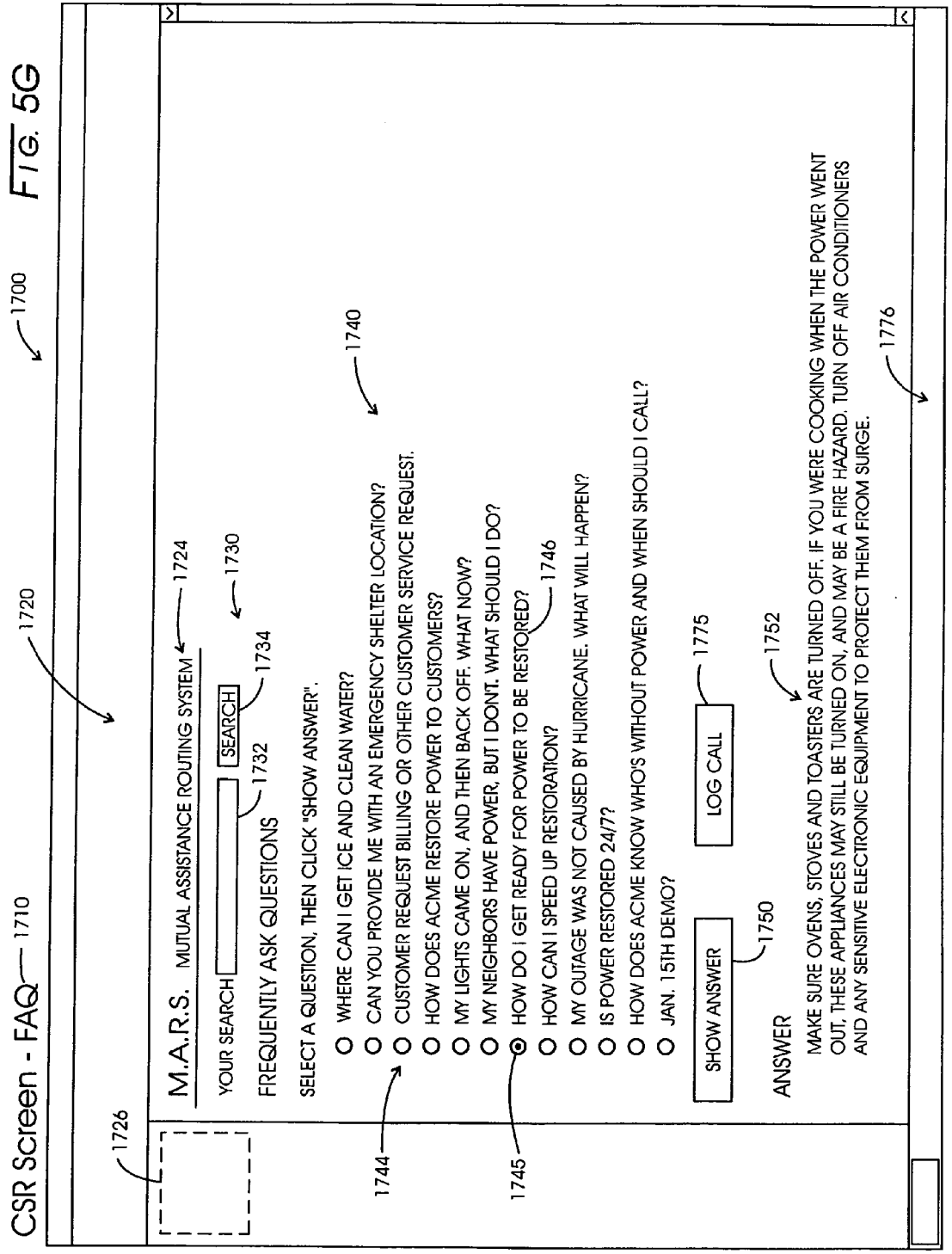

A preferred embodiment of the new system is a customer service representative interface screen that is immediately recognizable by a CSR as a MARS interface, and is a CSR interface that is readily learned by customer service representatives that participate in cooperative sharing through MARS. Thus, CSRs must learn only their home interface, for assisting customers of the responding provider, and the MARS CSR interface, for assisting customers of all of the other participants in the MARS cooperative system. One of the significant failings of previous attempts to cooperatively utilize the customer service capacity of different companies is that the ability of CSRs to learn a new system delays the shared CSRs in effectively serving the customers of others. During a crisis, shared CSRs would need to learn a new system and new parameters for dealing with the customers of others. By the time the shared CSR had learned a new system the crisis was typically abating. Moreover, it has heretofore not been practical to share CSRs on an as-needed basis, because there has been no provision for switching between customers of different enterprises on an ongoing basis. Thus, the MARS interface shown in FIG. 5E-G immediately announces to a CSR which enterprise originated the customer currently being served and provides the tools necessary for the CSR to effectively and efficiently serve whatever the customer contact requires of the agent. Once customer service agents for a responding provider have been activated and logged into the MARS system, they will be provided a universal interface screen such as are shown in FIG. 5E-G, to assist the agent in properly managing the customer contact. It is readily apparent that the structure of the universal interface screen can be altered to fit particular industries or conditions.

Turning to FIG. 5E, a universal customer data entry interface is shown at 1500. An agent of a responding provider, being contacted by a customer of a requesting user through MARS, will be presented with an interface such as interface 1500. Screen title 1510 identifies the particular screen, as a customer data entry interface screen, while address interface panel, generally at 1515, allows for listing or entry of the interface address. The customer service representative is notified that the customer service representative is utilizing the MARS system by interface title panel 1520. The MARS connection can be noted as at 1522, and the name of the requesting user and/or the responding provider identified at 1524. To assist a customer service representative in quickly identifying the source of the call, i.e., the identity of the requesting user, a name and logo combination can be displayed at 1526. Because in certain crisis situations customer service representatives may be taking calls from a variety of requesting users, prominently announcing the identity of the requesting user allows any customer service representative to act as an agent of the requesting user without causing dismay to the customer.

In the example shown in FIG. 5E, the customer contact would typically already have navigated an interactive call response system directing the communication to an agent best able to provide the desired service. (See the discussion with respect to FIGS. 3, 4 and 6) Thus the interface displayed at 1500 provides the information necessary to deliver the desired services. In FIG. 5E the hypothetical customer contact is a result of the customer experiencing a power outage due to a hurricane. If such data is available, the customer identity associated with the customer account and an account number can be provided, such data potentially available by comparison of the incoming telephone number with customer data present in the requesting user customer database, should such database be accessible through MARS. Generally at 1530 is the interface for assisting a customer with reporting a power outage, with 1532 identifying the problem addressed, and providing a script for the customer service representative to request additional information. Instructions 1534 provide the customer service representative with information necessary to complete the desired task, such as entry of a customer contact number in field 1536. Although not shown in FIG. 5E, one or more "continue" buttons will be provided to allow logging of the entered data and continuation of the customer service. At 1540 is provision for dealing with a customer without a telephone, with 1542 identifying the problem addressed, and providing a script for the customer service representative to request account information. Instructions 1544 provide the customer service representative with information to assist completing the desired task, including entry of the customer account number in field 1546. Similarly, for example, at 1550, is a provision for dealing with a customer who either does not have an account, or does not know the account number, with 1552 identifying the problem addressed, and providing a script for the customer service representative to request personal information. Instructions 1554 provide the customer service representative with information to assist completing the desired task, including entry of the customer first and last names in fields 1556 and 1557. Other information can be requested, including a request for an address at 1560, to be entered in field 1562. Other information presumed to be useful to the customer service representatives of a responding provider are provided in box 1570, and 1572. Furthermore, available menu options may be provided in menu box 1575, along with status indicators or announcements in box 1590. Once a customer service agent has entered data into the universal interface, the logging of the customer data collected can be logged into the databases provided so that action may be taken as a result of data collected from the call.

Turning now to FIG. 5F, a universal customer service representative customer matter closing screen interface (UCS closing screen) is shown at 1600. After an agent of a responding provider completes the inquiry process while assisting a customer of a requesting user through MARS, the UCS closing screen loads. Screen title 1610 identifies the UCS Closing screen, while address interface panel, generally at 1615 remains positioned as on other universal screens. Interface title panel 1620 notes the MARS connection at 1622, and the name of the requesting user and/or responding provider identified at 1624, and the identity of the requesting user can be displayed at 1626. The customer information interface displayed at 1630 provides the information regarding the customer, including information gathered during the call. Restoration time panel 1640 allows the CSR to provide feedback from the requesting user database that is useful to the customer, such as estimated service restoration time, and message panel 1650 may identify a closing message that the CSR can provide to the customer. At callback field 1660 is a provision for giving the customer the opportunity to request a callback or other action, by checking box 1662 to request action 1664. For obtaining a callback, callback number field 1666 may be populated by the CSR under the customer's direction, or can be automatically populated with the customer's telephone number of record, to be confirmed by the CSR. A number of fields in the UCS screens can be provided as highlighted hyperlinks, such as hyperlink 1670, which upon selection by the CSR results in redirection of the CSR to another interface, or initiation of another action, such as contacting public safety personnel. The CSR can be prompted to log the data from the call by activating log call button 1675, with such action being configured to also create a call data record containing the pertinent data from the call, including, for instance, the data shown in interface 1600. As with other screens, status bar 1690 is utilized.

As shown, in FIGS. 5D and 5G, customer service agents may be provided answers to frequently asked questions as part of the universal interface. FIG. 5D showed an administrator interface screen that would allow a requesting user administrator to prepare answers to frequently asked questions to the customer service agents of a responding provider. Access to those responses is provided as shown in FIG. 5G. FAQ interface 1700 is configured with a screen title 1710 identifying the CSR FAQ screen, an address interface panel, generally at 1720, interface title panel 1724 and 1726. Search panel 1730 allows customer service representatives to search for specific questions and responses, by entering a search term at 1732, and activating search button 1734. In additional to a searchable FAQ database, the most frequently encountered questions can be made available as a list to CSRs, as shown in default FAQ panel 1740. The CSR can check one or more of buttons such as button 1744 (checked in 1745), and the response to chosen questions such as question 1746 are displayed after triggering "show answer" toggle 1750, with the answer displayed at answer panel 1752. The call can be logged to the CDR and or terminated by button 1775, and the system status determined by reference to status panel 1776. The requesting user administrator can provide and determine which of a subset of FAQs are listed in panel 1740 through the FAQ administrative interface as shown in FIG. 5D. In addition, the FAQs can be updated during a crisis, in response to changing conditions.

Figure 5H:
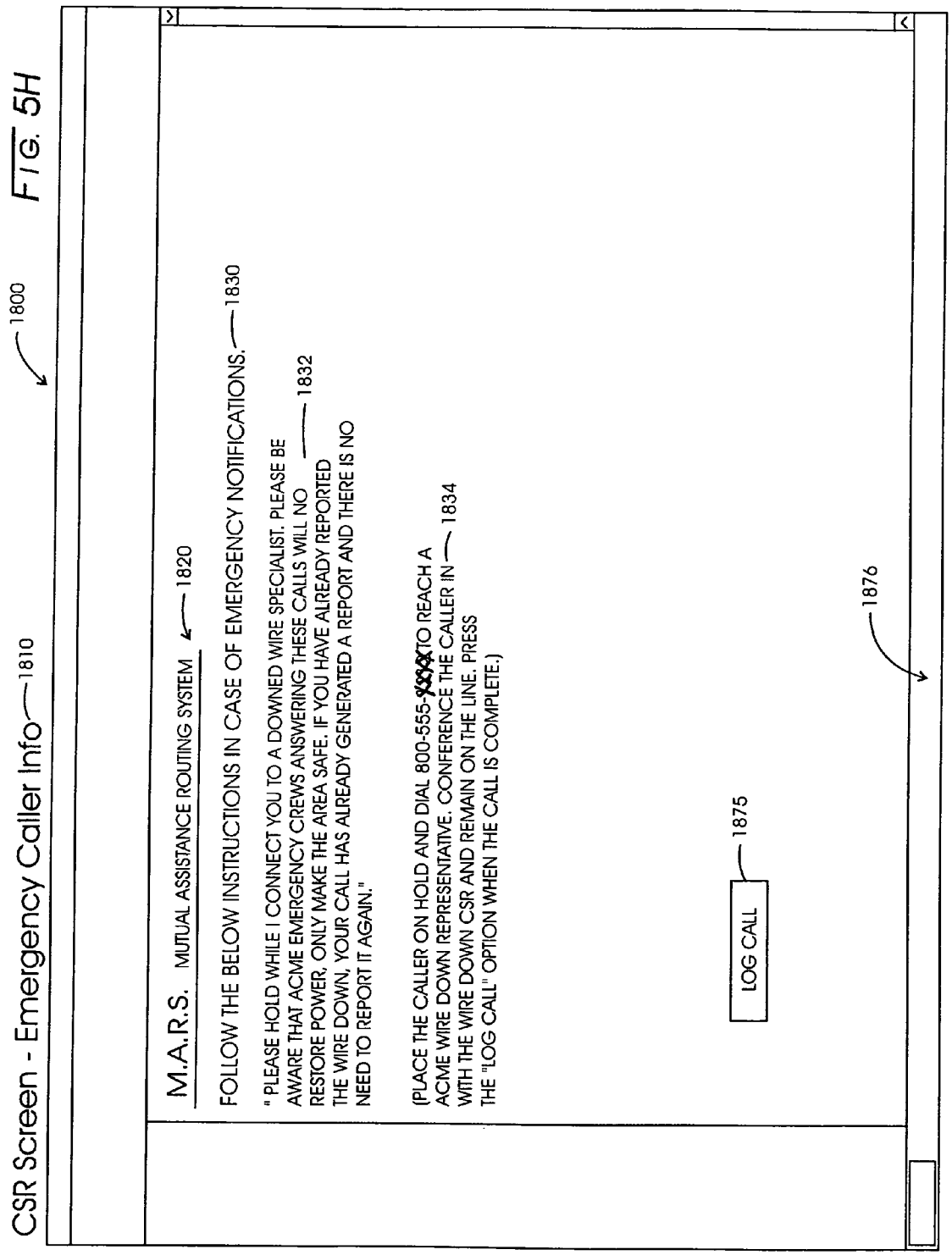

Finally, a number of scripts that allow the customer service agent to provide appropriate responses to the customer contact may be provided. FIG. 5H shows one such example, wherein a customer indicating an emergency exists may be alerted to the proper action to take. If, for instance, the hyperlink at 1770 of FIG. 5F is triggered, the CSR would be immediately transferred to the Emergency Caller info screen 1800 demonstrated in FIG. 5H. Again screen title 1810 announces the interface, and location title 1820 emphasizes the MARS status of the CSR connection. Headline 1830 states the purpose of the interface screen 1800. Script 1832 provides a prepared statement for the CSR to deliver to the customer with an emergency situation. In an emergency situation, especially when a customer is being routed through the MARS system, it is important for customer safety that the call is not inadvertently disconnected or the customer becomes frustrated and flees without assistance being rendered, or at least the emergency identified. Panel 1834 provides specific instructions to a MARS-based CSR on how the requesting user wishes to deal with emergency situations. In addition, as configured in FIG. 5H, the CSR initiating the emergency connection to emergency services will typically remain on the call with the customer. Once the emergency call is complete, the CSR can log the call by activating button 1875, and determine the present status of the call by referring to status panel 1876. Further disclosure of the details of the MARS interface and utilization of the MARS system elements is found in the "Mutual Assistance Routing System (MARS) User Guide, Mar. 10, 2009 version.

Example 2

Call Routing System for Sample Municipal Utility

Some of the most important users of the MARS system are electric utilities. There are more than 80 major electric utilities in the United States. Because of requirements for efficient the operation of the electric power grid, electric utilities are exposed to substantial risk of service disruption resulting from natural disasters, such as hurricane, tornado, thunderstorms and ice storms, for instance. In times of natural disaster these electric utilities make use of mutual assistance agreements to restore electric service as quickly as possible. Utility crews are dispatched to remote locations to assist local utility crews in restoring electric service. As a result of these long standing mutual assistance agreements, electric utilities are amenable to agreeing to share customer service resources on the occasion of substantial service disruption. It is apparent, however, that sharing of resources may be useful on other occasions when a disaster is not at hand, for instance, to make available customer service resources at low volume hours by "time shifting" requests to a utility in another time zone, or to have customer service agents available when other disruptions may occur, for instance a telecommunications failure at a utility's primary facility.

Because diverse utilities are expected to derive great benefit from the MARS system, a specific customer contact routing arrangement for an electric utility customer initiating contact through means of a telephone is shown in FIG. 6, panels A-N. FIG. 6A demonstrates the call routing of four or more hypothetical incoming calls to hypothetical contact numbers (DNIS) for the utility Acme City Utility, during an event that would lead to utilization of the HVCA system and the MARS customer service sharing system. The acronym DNIS is generally accepted to mean "dialed number identification service." For purposes of this application a DNIS is considered any verifiable address for receiving incoming customer contacts, including such identifiers as an internet protocol address, an email address, or an verifiable internet logon. Acme City Utility provides electric service, natural gas service and other services. FIG. 6 demonstrates the integration of the MARS system into a typical customer service operation, including a customer service operation that is utilizing another IVR-based high volume call answering (HVCA) system. At blocks 402, 406, and 412, the initial routing of incoming calls is determined. If the number 553-1594 or 553-1595 (general service numbers listed for Acme) is called, arrow 403 is followed to block 405, wherein an all-caller message is announced, and arrow 407 is followed to block 416. If DNIS 553-1596 is called, for instance a billing number, arrow 408 is followed to block 409, wherein a request to leave a voicemail is delivered. If DNIS 553-1545 is called (an electric power outage reporting listed number), calls are routed directly to the outage reporting system (in FIG. 6M) by following arrow 413. All other incoming customer calls follow arrow 414 to block 416.

Figure 6B:
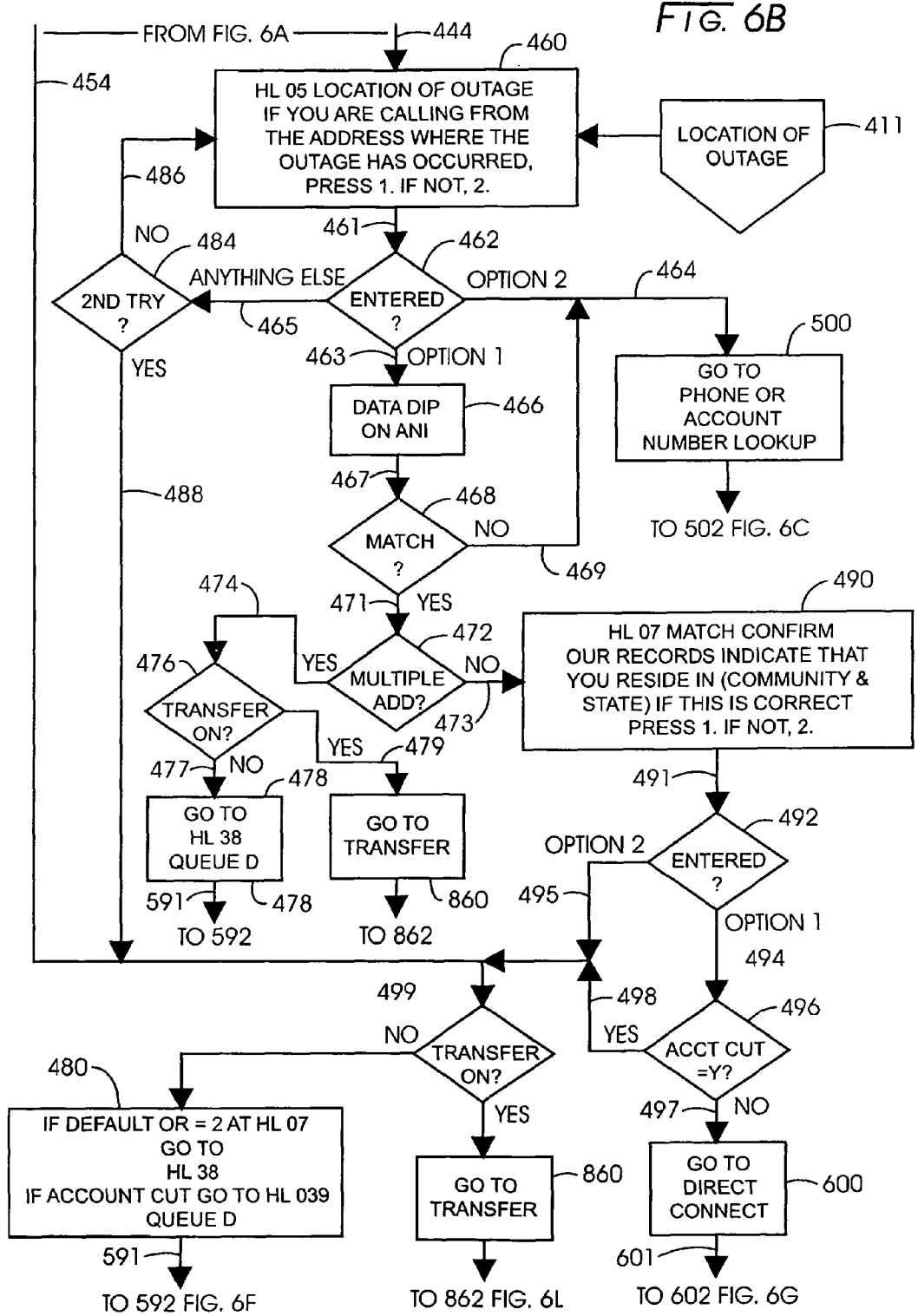
FIG. 6A-N show an example of a call routing system utilizing the mutual assistance routing system functionality.

Arrows 454 and 444 continue to FIG. 6B, with arrow 444 leading to block 460, where an IVR request is made to allow the caller to identify their location based on their telephone information. Based on the response arrow, arrow 463 is followed to block 466, wherein the Acme database is queried, (e.g., block 235 of FIG. 2). If the address identified and the address stored in the database do not match, arrow 469 is followed. If there is a match, arrow 471 is followed and at block 472 a query is presented whether the location identified is associated with multiple customers, e.g., an office building or apartment complex. If only a single address is associated with the incoming contact, arrow 473 is followed to block 490, where an announcement is provided to the customer, allowing the customer to confirm the location of the outage being reported. If confirmation is received at block 492, arrow 494 is followed to block 496, wherein a query is made as to whether the account has been disconnected for some reason. If the response to the query is NO, arrow 797 is followed to block 600, leading to a direct connection with either a native IVR system, a HVCA system or other electronic responsive system as described with respect to FIG. 6G. If, at block 492, option 2 is selected, noting that the wrong address is identified, or the query at 496 is YES, arrows 495 and 498 respectively are followed to intersect with arrow 454, leading to block 499.

Returning to block 462, if any entry is made other than a 1 or a 2, arrow 465 is followed to block 484, wherein the caller is given the option to attempt a second try at entering a response. If a request is made for another attempt, arrow 486 is followed, returning to block 460. If no entry for a second attempt is made, arrow 488 is followed to intersect with arrow 454 (from FIG. 6A), leading to block 499. At 499, a query is presented to the system as to whether a transfer utility is active. If no transfer is active, the default "no transfer" path is followed to block 480, wherein various voicemail queues are entered as described by following arrow 591, continued in FIG. 6F. If a transfer protocol to the MARS system is active, from block 860, the go to transfer command leads to block 862, described in connection with FIG. 6L. Returning a final time to block 462, if option 2 is selected, arrow 464 is followed to block 500 and the account or number look up utility is utilized at block 502 in FIG. 6C.

Figure 6C:
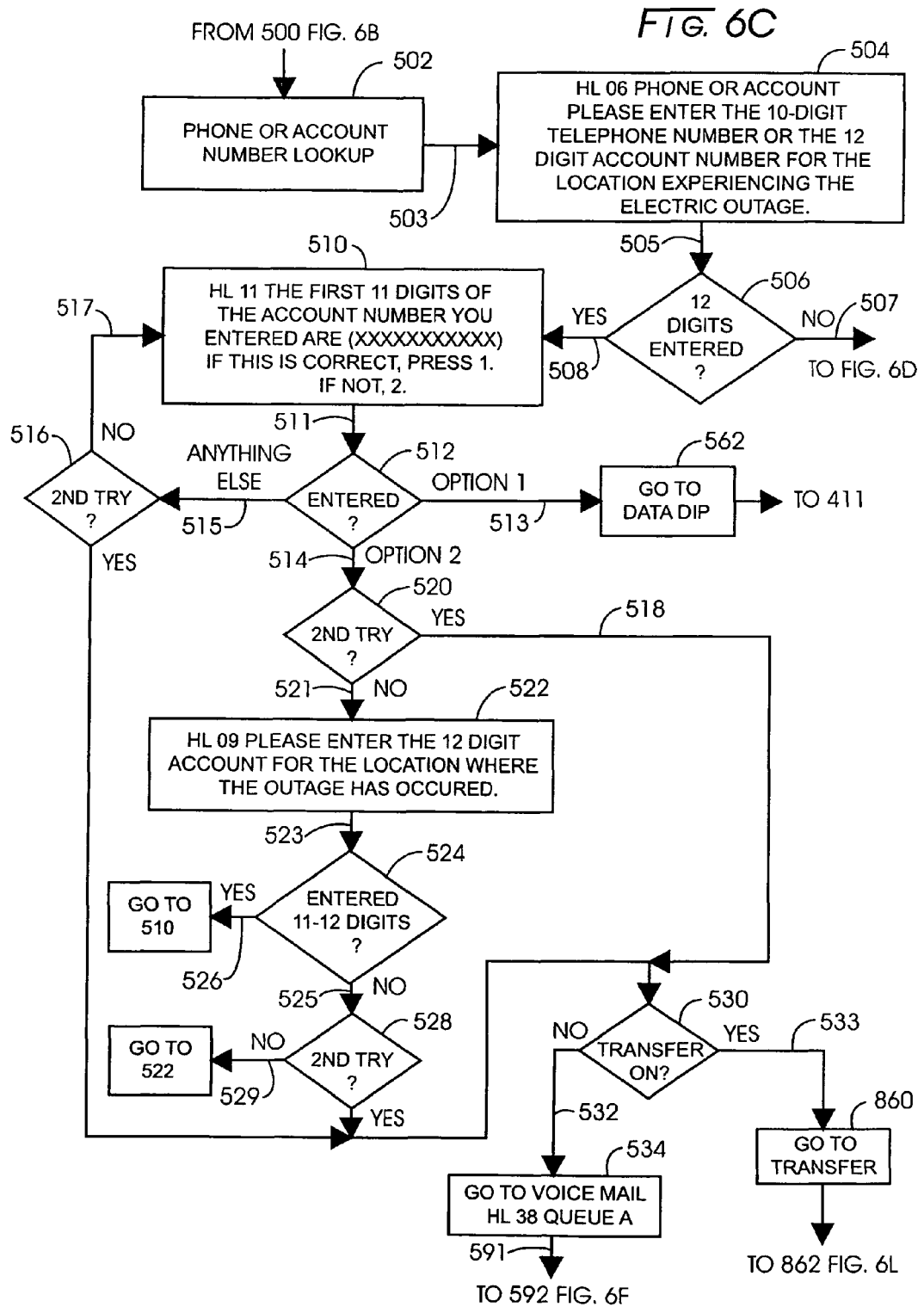
Figure 6D:
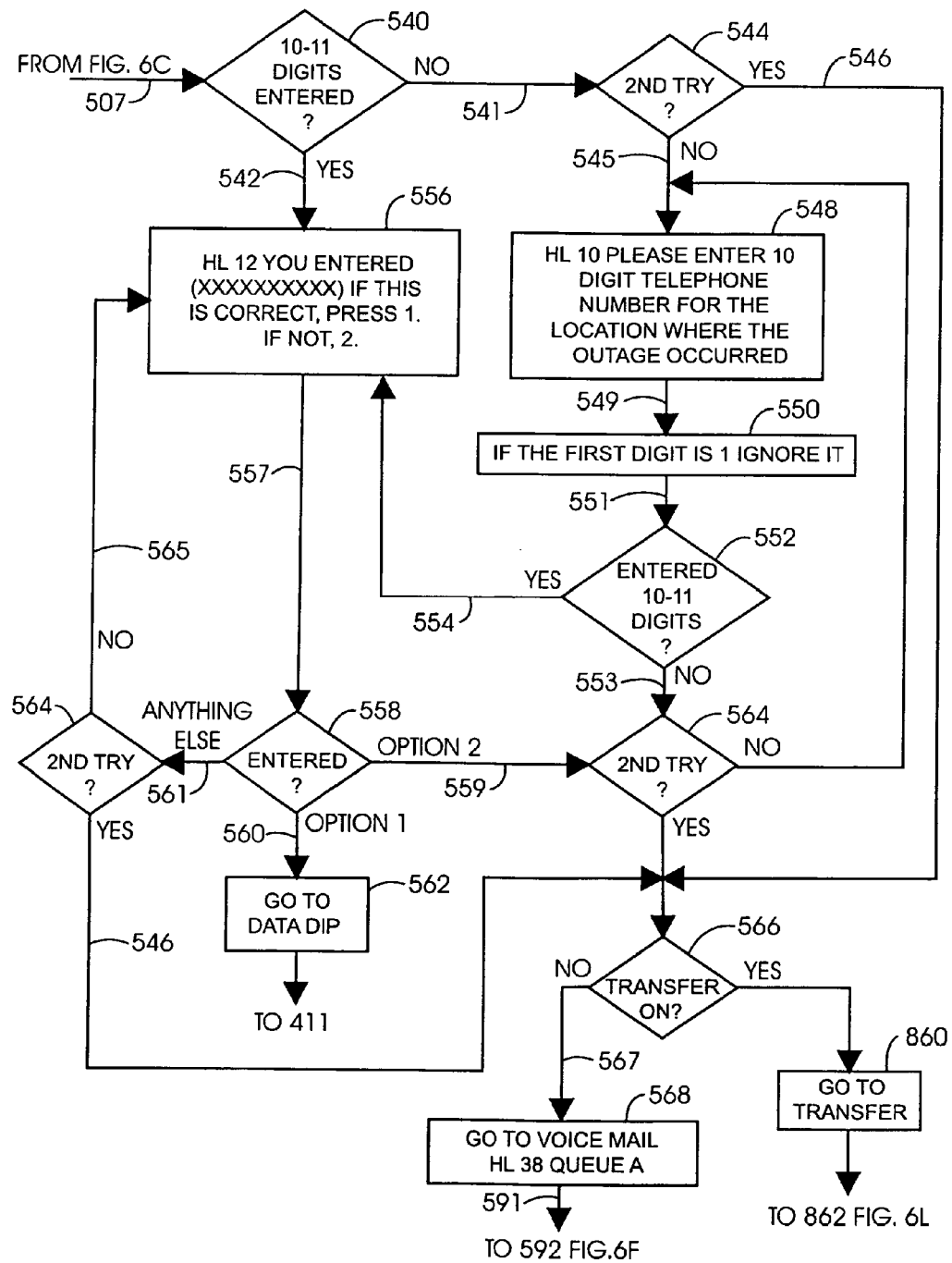

Beginning with block 502 of FIG. 6C, and continuing to FIG. 6D, an identifier look-up utility is disclosed. As part of the look-up utility, at block 562, access to a customer identifier database is provided. If an account number or other identifier look-up is successful, arrow 518 or arrow 546 are followed to block 530, providing a parallel transfer utility to that described in connection with block 499 in connection with FIG. 6B.

FIG. 6E is reached by following arrow 431 of FIG. 6A to block 571, providing a system for reporting a gas leak or other analogous type of life threatening emergency. As shown in FIG. 6E, a transfer to a live call agent is attempted at block 576 (preferably to a native CSR, but alternatively through MARS). If no agent is available, the caller is routed via arrow 584 to block 586, where the caller is instructed to call emergency personnel. The announcement at 586 can be tailored to other situations where calling 911 may not be practicable.

Figure 6F:
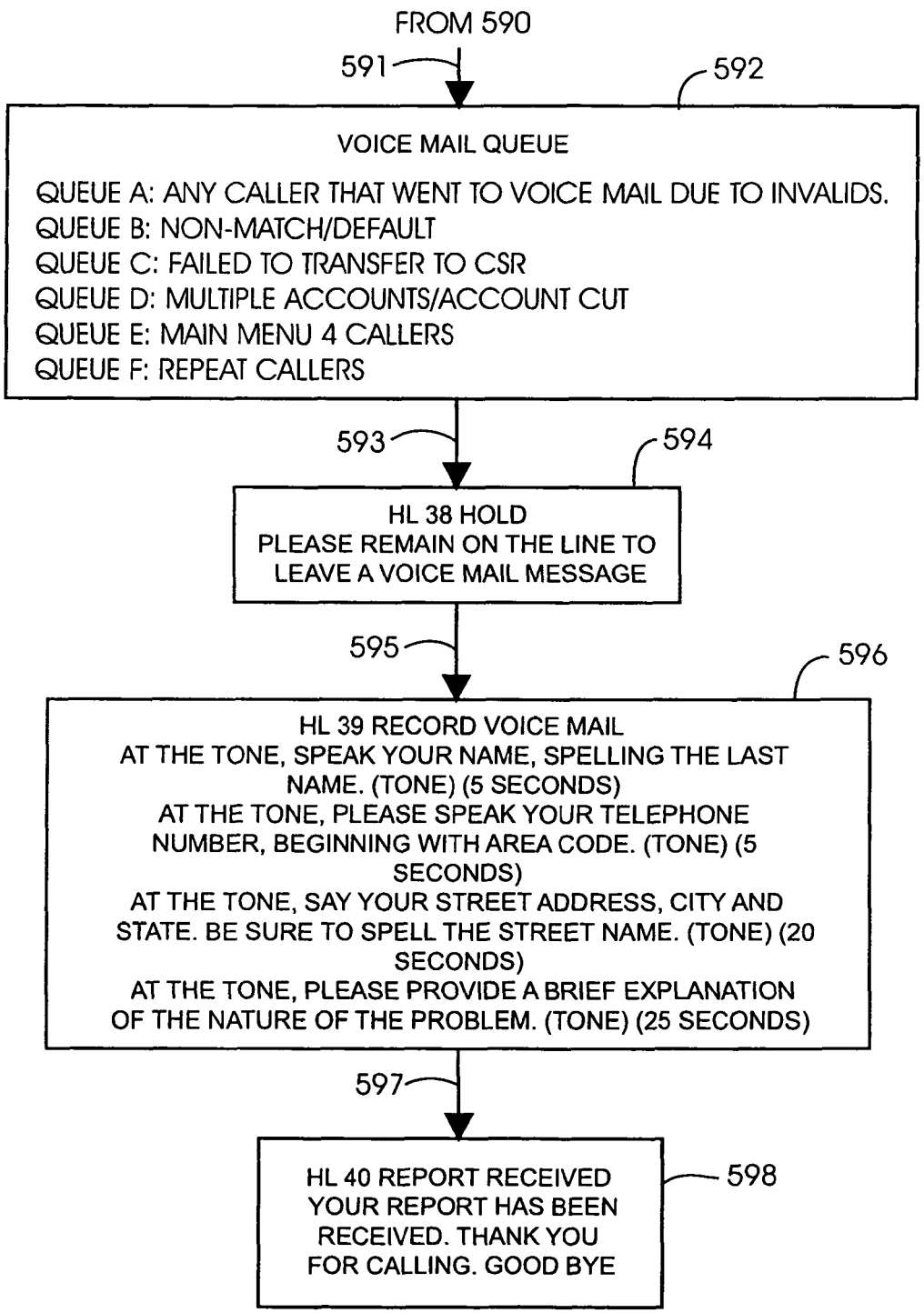
Figure 6H:
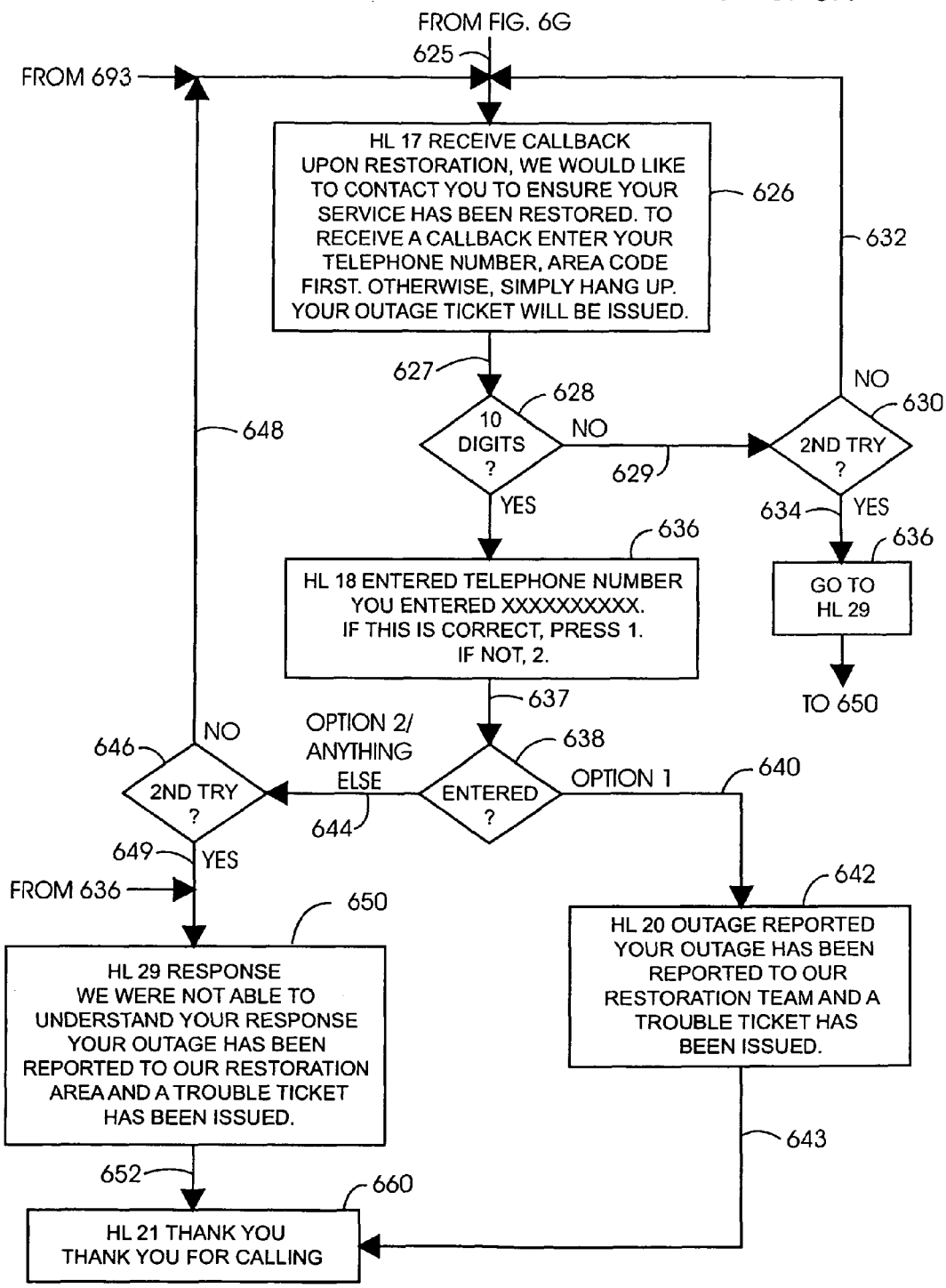
Figure 6I:
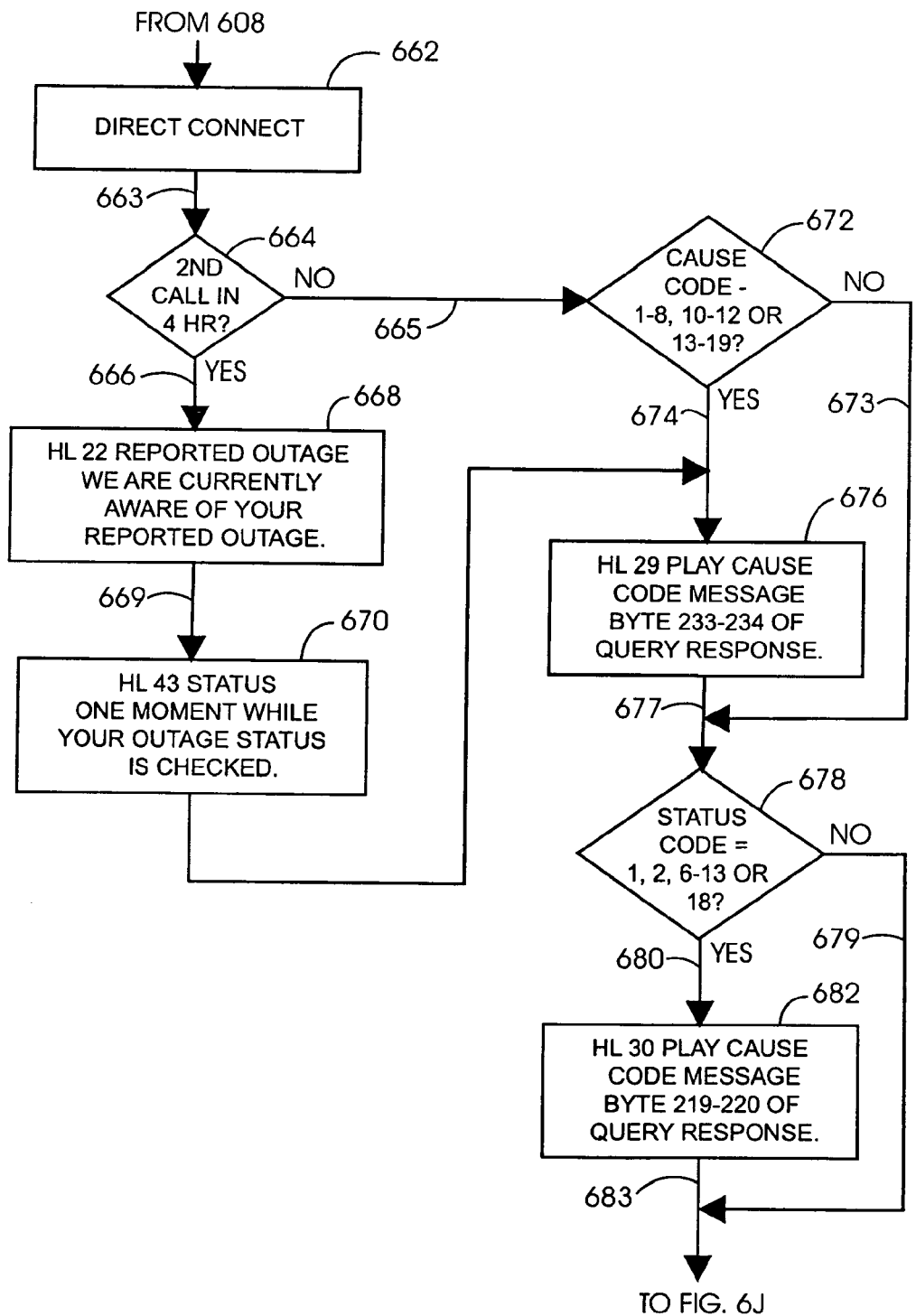
Figure 6J:
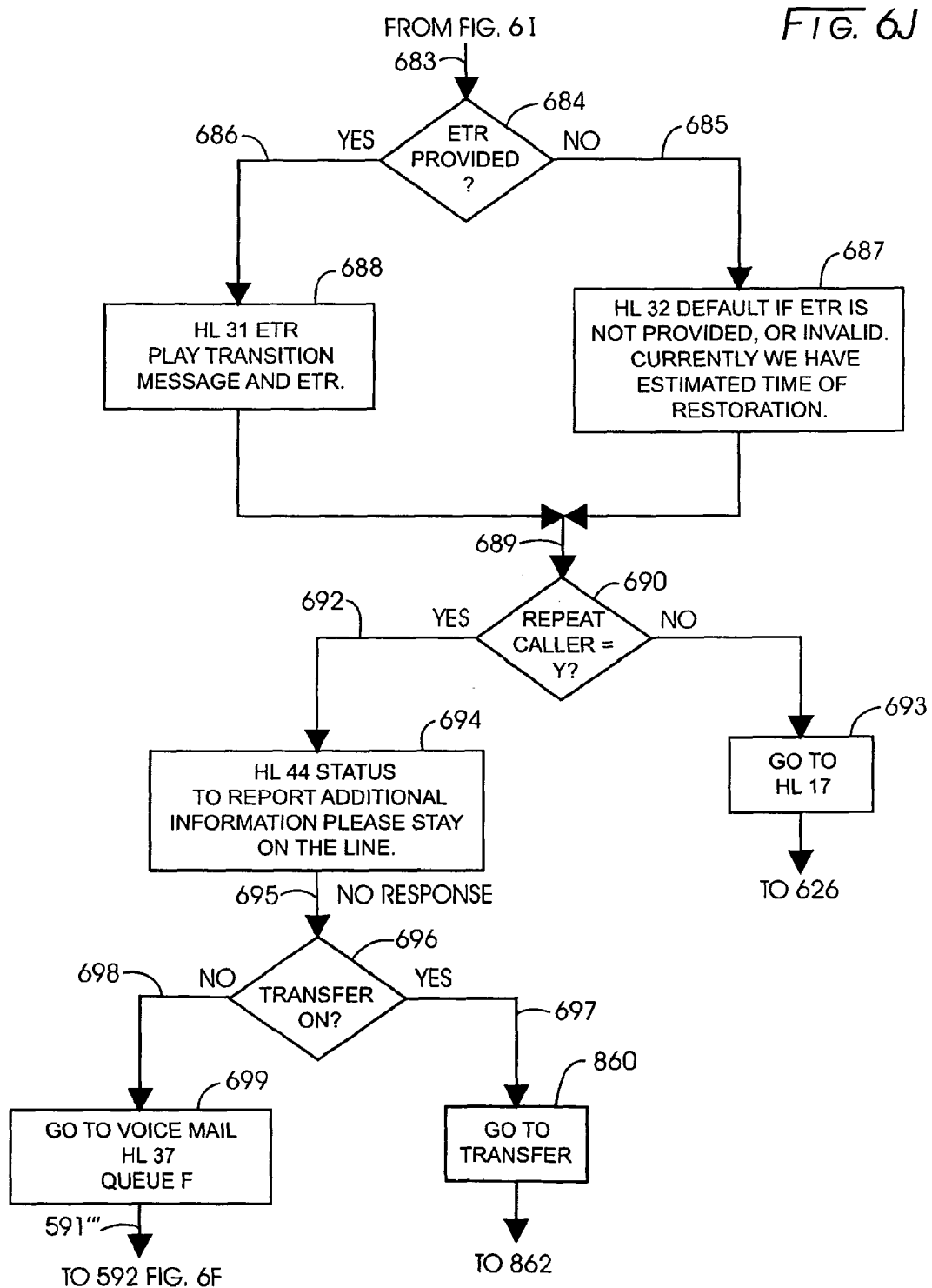
Figure 6K:
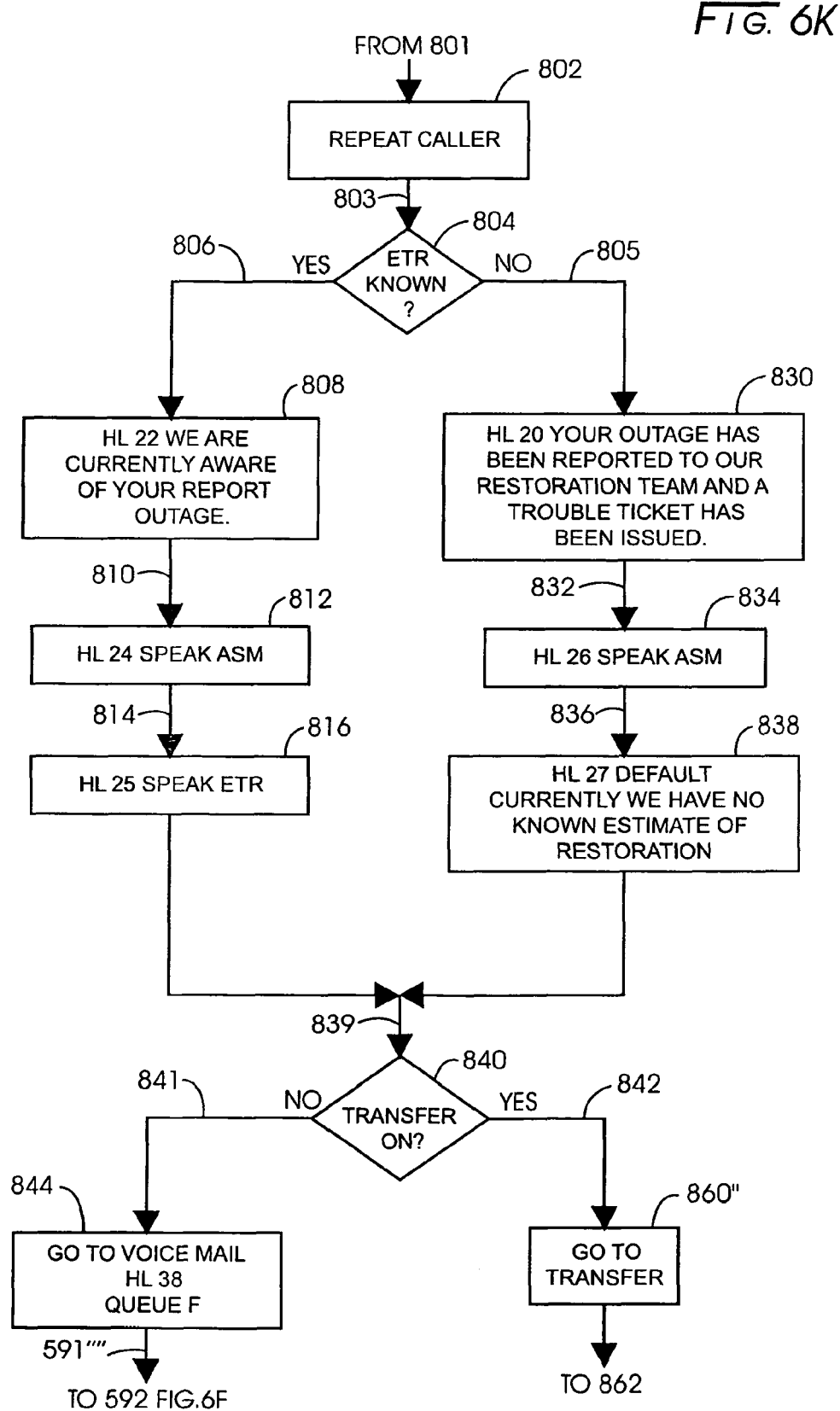
Figure 6M:
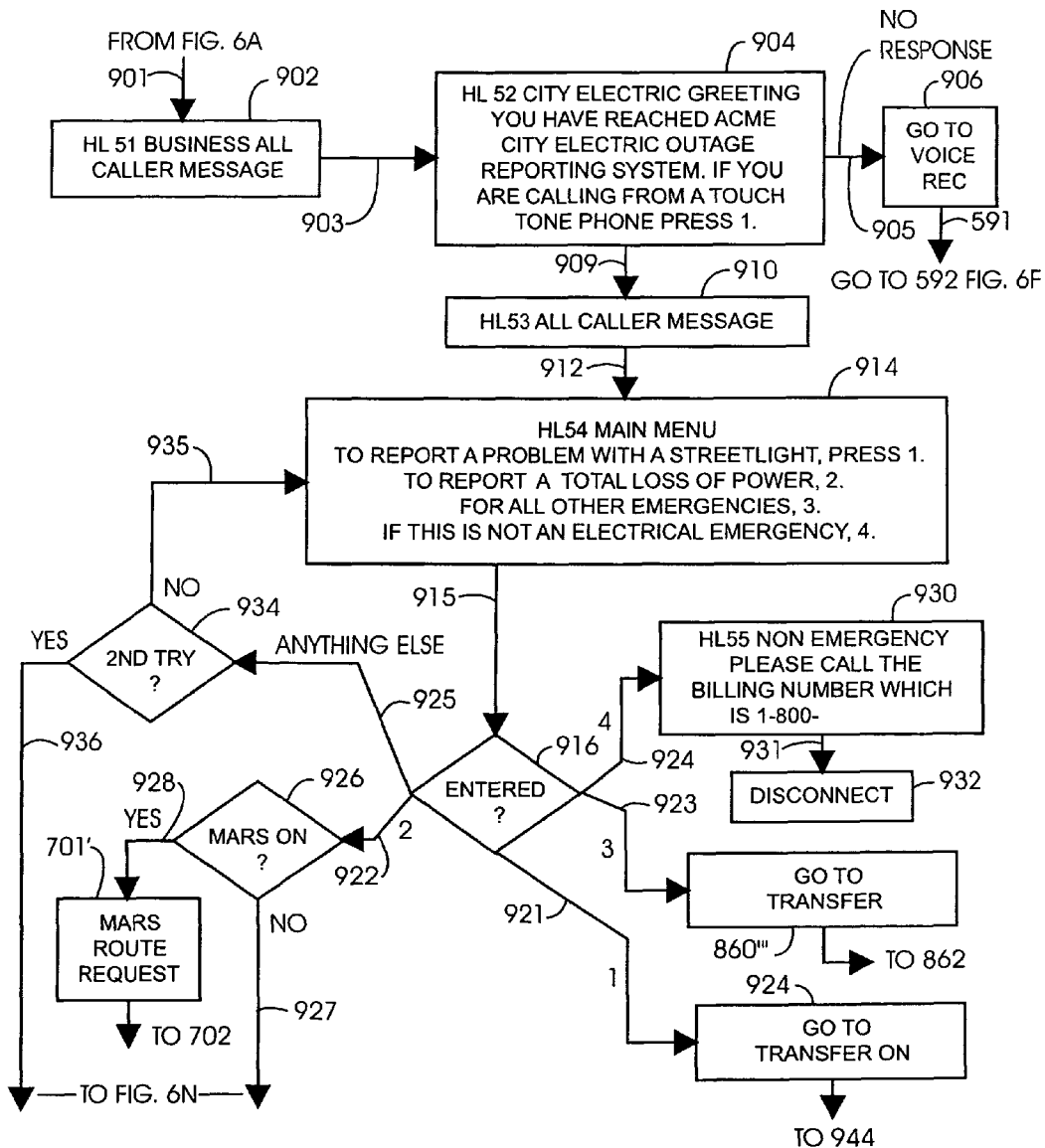

FIG. 6F discloses one embodiment of a voice mail protocol, reached via block 680 of FIG. 6B or block 534 of FIG. 6C, for example. Following arrow 591 to block 592, a variety of different voice mail queues may be provided for efficient response when time becomes available. Instructions, familiar to most customers, are provided at block 596, and a confirmation of the voicemail message is provided at block 598. Preferably, the call is disconnected after the customer has left a voicemail, but first-time or repeat callers could alternatively again be provided with the opportunity to return to the CSR queue and to seek a live agent.

From block 600 of FIG. 6B, arrow 601 leads to the direct connect utility disclosed in FIG. 6G-K. After navigating the IVR system disclosed in FIG. 6G-K, the customer will eventually reach a termination point, at which the customer disconnects, enter the voicemail utility, beginning at block 592, or enter the transfer protocol at block 862.

At FIG. 6A, if a customer has contacted a DNIS identified specifically provided for reporting electric service outages, arrow 413 is followed to block 900, leading to block 902, and an all-caller message is delivered. The call routing protocol disclosed in FIG. 6M, continuing to FIG. 6N, essentially parallels the protocol disclosed in FIGS. 6A,B, with more direct provision for reporting electric power outages.

Example 3

Call Data Recording and Metering System

Figure 7A:
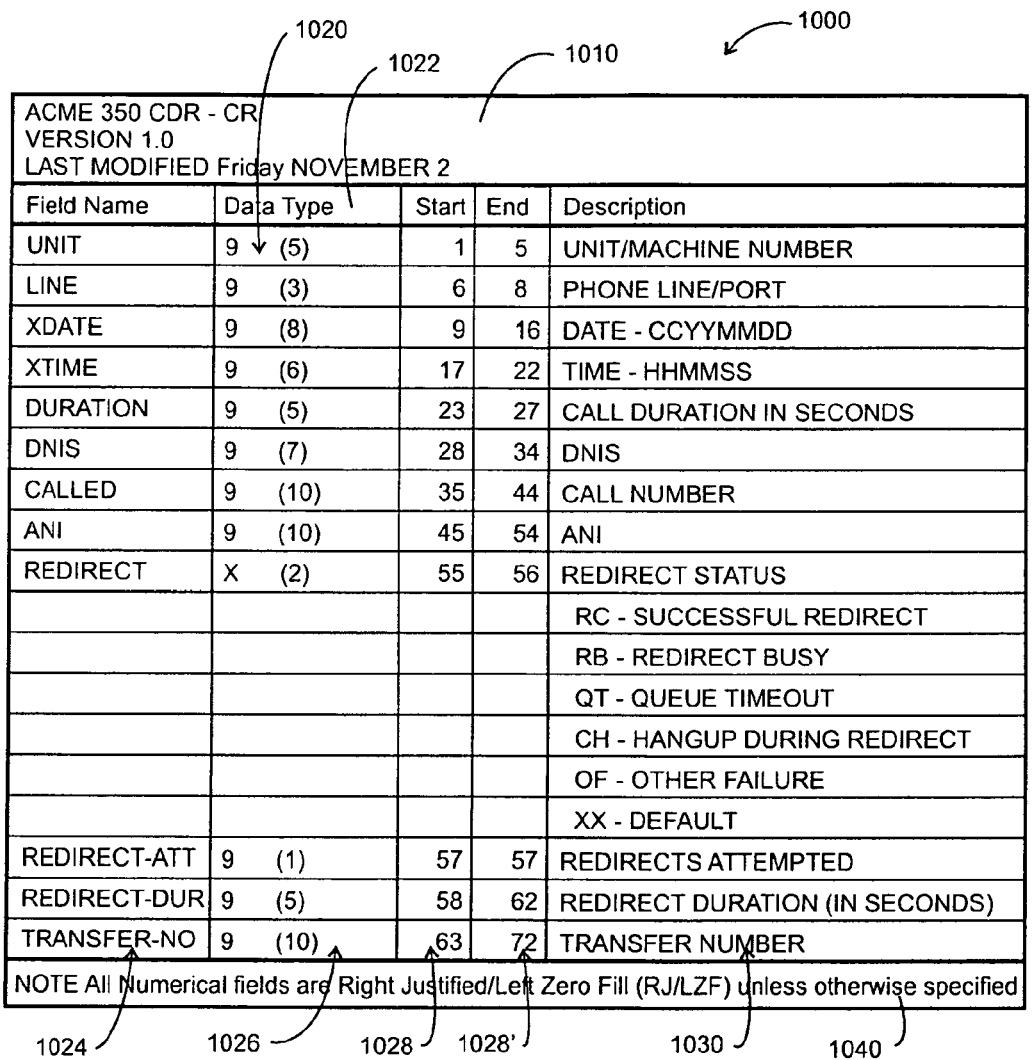

FIGS. 7A,B shows an example of a call data record summary from a hypothetical call routing through the system. In FIG. 7A, is shown the data structure 1000 for a CDR created for a hypothetical utility, providing a limited number of parameters useful for reviewing and metering call traffic. When filled with data, the different fields will be populated with data from actual calls. An abbreviated report such as produced from report form 1000, will typically quantify the numbers of events associated with the MARS activation. Field 1010 is a CDR title panel, while field 1020 is generally a number of different fields, selectable at the option of one or more administrators. Field 1040 is useful as an announcement panel to note features of the report presented. Field 1022 is a header row field, identifying the columns in the report, with column 1024 listing an abbreviated field name, field 1026 either listing data itself, of as shown here formatting information on the data field, column 1028 and 1028' identify in the CDR data structure the position of the field data for different field name entries, and finally column 1030 is embodied to provide a fuller description of the data recorded in different fields. As shown in structure 1000, parameters such as date and time, call duration, the redirection status, and transfers completed can be recorded.

FIG. 7B shows a sample CDR that could be configured to list the CDR for a single call or report multiple parameters for call through the MARS system during a campaign. When filled with data, the different fields will be populated with data from actual calls. An report such as produced from CDR form 1100, will typically quantify a numbers of events associated with the MARS activation. Field 1110 is a CDR title panel, while field 1120 is generally a number of different fields, the identity of the fields selectable at the administrators. Field 1140 is useful as an announcement panel to note features of the report presented. Field 1121 is a header row, identifying the columns in the report, with column 1122 listing an abbreviated field name, field 1124 either listing data itself, or as shown here formatting information on the data field, column 1026 and 1026' identify within the CDR data structure the position of the field data for different field name entries, and finally column 1028 is embodied to provide a fuller description of the data recorded in different fields. As shown in structure 1100, parameters such as date and time, call duration, the redirection status, and transfers completed can be recorded. In addition, for an individual call report, the utilization of database access, FAQs and identification of representatives used can be recorded. From such CDR data a variety of useful reports for detailing the utilization of the MARS system are practical.

The system and method are further embodied in a metering and data recording system for use with MARS that involves utilization of the MARS administrative module providing requesting users and responding providers to log the various call parameters of interest. In the initial negotiation between requesting users and responding providers, whether conducted in person, before an event, during an event via telephone or other telecommunications connection, or utilizing an automated system made part of the MARS administrative module, the requesting users and responding providers request assistance, offer to provide that assistance on terms that are mutually acceptable. The MARS CDR system allows the participants through MARS to utilize the MARS CDR functionality to report on the various call metrics and outcomes to effectively monitor the utilization of the system, and through metering of the system, effectively compensate one another for services provided. The MARS administrative module integrates the control parameters provided by requesting users and responding providers, and through the call routing module, responds to the control parameters provided by the administrative module. As the call data record database collates call data records data is collected that enables measuring the customer service resources provided by the responding provider. After activation of the MARS system, customer contacts directed to the requesting user are automatically distributed to the available customer service agents of the requesting user and responding provider. As customer service agents of a responding provider provide service to customers through the MARS call routing system, call parameters relevant to determining the services provided are recorded in a database of the mutual assistance call routing system in order to provide customer service reports and billing statements to the requesting user(s) and/or the responding provider(s). It should be recognized that a variety of call data can be readily accumulated by utilization of the database resources of the MARS apparatus, and the specific data recorded (and the corresponding CDR) can be modified and adapted to fit particular operations.

The metering and data recording system can be configured to integrate the call data records into a report that lists one or more of, for instance, agent available time, call duration, number of redirected agent contacts, number of customer agent hours, customers served, total elapsed agent time, overflow rate and resolved customer problems. Moreover, the CDR system can track in real-time the number of calls in progress, the number of calls-in-queue, and unresolved problems that may need attention. Thus, on-the-fly, i.e. in real-time, administrators can update call allocation, FAQs to better address issues that may be arising and agent availability, for instance, by bringing additional responding providers on-line, activating additional agents from presently active responding providers, or other actions considered prudent depending on conditions. The CDR system and the ability of administrators to respond to changing conditions emphasizes the flexibility of the MARS system, where heretofore, only broad adjustments to agent allocation (possibly including physical travel to remote or inaccessible locations) were possible.

Additional parameters useful for operating a metering system include the total cumulative call duration, average call duration, the number of redirected incoming customer contacts, the number of resolved customer problems or customer requests, the number of unresolved customer problems, the redirected calls to voicemail, the emergency or safety hazard calls, and the percent of resolution of incoming calls. Typically, it will also be useful to meter the number of customer service agents made available, the number utilized and the extent of the utilization.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above compositions and methods without departing from the scope of the invention herein involved, it is intended that all matter contained in the above descriptions and examples or shown in the accompanying drawings shall be interpreted as illustrative and not in a limiting sense. In this application all units are in the metric system and all amounts and percentages are by weight, unless otherwise expressly indicated. Also, all citations referred herein are expressly incorporated herein by reference. All terms not specifically defined herein are considered to be defined according to Webster's New Twentieth Century Dictionary Unabridged, Second Edition. The disclosures of all of the citations provided are being expressly incorporated herein by reference. The disclosed invention advances the state of the art and its many advantages include those described and claimed.

What is claimed is:

1. A system, comprising:
a mutual assistance administrative module configured to integrate control parameters provided by requesting users, responding providers and reallocated additional responding providers used in selective transfer of requesting users;
a call routing module configured to respond to the control parameters provided by the mutual assistance administrative module to route said requesting user to one of said responding providers and said additional responding providers; and
a mutual assistance call routing system that is configured to distribute customer contacts directed to the requesting users to the responding providers that are configured to communicate with a database of at least one of the requesting users in order to provide information to the at least one requesting user from one of said responding providers and said additional responding providers.

2. The system of claim 1, wherein the requesting users comprise one or more of electric utilities, gas utilities, cable television utilities, banks, health insurance providers, insurance providers, homeowner's insurance providers and airlines.

3. The system of claim 1, wherein the mutual assistance routing system is activated during a service outage.

4. The system of claim 1, comprising an administrative system configured to allow the requesting users and the responding providers to set call parameters.

5. The system of claim 4, wherein the call parameters comprise one or more of a number of agents, a time of agent availability, a routing protocol, an incoming customer contact address, a budget amount, and an agent supply rate.

6. The system of claim 1, wherein the customer contacts are routed based on an apportionment priority, agent availability priority, and responding utility provider priority.

7. The system of claim 1, comprising a universal interface module configured to communicate with at least one responding provider.

8. The system of claim 1, wherein customer service agents of the responding provider are configured to communicate through a universal interface screen with the database of at least one of the requesting user.

9. The system of claim 1, comprising a mutual assistance call routing system that is configured to distribute customer contacts directed to the requesting users to available customer service agents of the requesting users and the responding providers.

10. The system of claim 1, wherein customer service agents of at least one of the responding providers are configured to communicate with the database of at least one of the requesting users in order to provide customer service to customers of the at least one requesting user.

11. A method, comprising:
- integrating, by a mutual assistance administrative module, control parameters provided by requesting users, responding providers and reallocated additional responding providers used in selective transfer of requesting users;
- responding, by a call routing module, to the control parameters provided by the mutual assistance administrative module to route said requesting user to one of said responding providers and said additional responding providers; and
- distributing, by a mutual assistance call routing system, customer contacts directed to the requesting users to the responding providers that are configured to communicate with a database of at least one of the requesting users in order to provide information to the at least one requesting user from one of said responding providers and said additional responding providers.

12. The method of claim 11, wherein the requesting users comprise one or more of electric utilities, gas utilities, cable television utilities, banks, health insurance providers, insurance providers, homeowner's insurance providers and airlines.

13. The method of claim 11, wherein the mutual assistance routing system is activated during a service outage.

14. The method of claim 11, comprising an administrative system configured to allow the requesting users and the responding providers to set call parameters.

15. The method of claim 14, wherein the call parameters comprise one or more of a number of agents, a time of agent availability, a routing protocol, an incoming customer contact address, a budget amount, and an agent supply rate.

16. The method of claim 11, wherein the customer contacts are routed based on an apportionment priority, agent availability priority, and responding utility provider priority.

17. The method of claim 11, comprising a universal interface module configured to communicate with at least one responding provider.

18. The method of claim 11, wherein customer service agents of the responding provider are configured to communicate through a universal interface screen with the database of at least one of the requesting user.

19. The method of claim 11, comprising a mutual assistance call routing system that is configured to distribute customer contacts directed to the requesting users to available customer service agents of the requesting users and the responding providers.

20. The method of claim 11, wherein customer service agents of at least one of the responding providers are configured to communicate with the database of at least one of the requesting users in order to provide customer service to customers of the at least one requesting user.

* * * * *